United States Patent
Teran et al.

(10) Patent No.: US 11,145,099 B2
(45) Date of Patent: Oct. 12, 2021

(54) COMPUTERIZED RENDERING OF OBJECTS HAVING ANISOTROPIC ELASTOPLASTICITY FOR CODIMENSIONAL FRICTIONAL CONTACT

(71) Applicant: THE REGENTS OF THE UNIVERSITY OF CALIFORNIA, Oakland, CA (US)

(72) Inventors: Joseph M. Teran, Los Angeles, CA (US); Chenfanfu Jiang, Los Angeles, CA (US); Theodore F. Gast, Los Angeles, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 0 days.

(21) Appl. No.: 16/610,315

(22) PCT Filed: May 17, 2018

(86) PCT No.: PCT/US2018/033226
§ 371 (c)(1),
(2) Date: Nov. 1, 2019

(87) PCT Pub. No.: WO2018/213607
PCT Pub. Date: Nov. 22, 2018

(65) Prior Publication Data
US 2020/0082589 A1     Mar. 12, 2020

Related U.S. Application Data

(60) Provisional application No. 62/507,740, filed on May 17, 2017.

(51) Int. Cl.
*G06T 13/20*      (2011.01)
*G06T 15/00*      (2011.01)

(52) U.S. Cl.
CPC ............ *G06T 13/20* (2013.01); *G06T 15/005* (2013.01); *G06T 2210/16* (2013.01)

(58) Field of Classification Search
None
See application file for complete search history.

(56) References Cited

U.S. PATENT DOCUMENTS

| 2010/0277475 A1 | 11/2010 | McAdams et al. |
| 2013/0103358 A1* | 4/2013 | Kavan ............... G06T 17/00 703/1 |

(Continued)

OTHER PUBLICATIONS

Nguyen et al. "Modeling the anisotropic finite-deformation viscoelastic behavior of soft fiber-reinforced composites", ScienceDirect International Journal of Solids and Structures 44 (2007) 8366-8389 (Year: 2007).*

(Continued)

*Primary Examiner* — Yanna Wu
(74) *Attorney, Agent, or Firm* — Foley & Lardner LLP

(57) ABSTRACT

At least some embodiments of the present disclosure relate to a method of visualizing objects having frictional contact. The method includes transferring masses and momentums of a plurality of particles of an object to a grid including a plurality of grid nodes; updating momentums of the grid nodes based on the transferred masses and momentums of the particles; transferring the updated momentums of the grid nodes to the particles of the object; updating positions of the particles and deformation gradients of the particles based on the updated momentums of the grid nodes; projecting the deformation gradients for plasticity of the object; updating elastic components and plastic components of the object; and outputting a visualization of the object based on the positions of the particles of the object.

20 Claims, 9 Drawing Sheets

(56) References Cited

U.S. PATENT DOCUMENTS

2015/0187116 A1 7/2015 Stomakhin et al.
2015/0242546 A1 8/2015 Jeon et al.

OTHER PUBLICATIONS

Guilkey et al., "Implicit time integration for the material point method: Quantitative and algorithmic comparison with the finite element method", International Journal for Numerical Method in Engineering, 2003, 57, pp. 1323-1338.
International Search Report and Written Opinion issued in PCT Application No. PCT/US2018/033226 dated Aug. 3, 2018, 9 pages.
Nguyen et al., "Modeling the anisotropic finite-deformation viscoelastic behavior of soft fiber-reinforced composites". International Journal of Solids and Structures 44 (2007), 24 pages.
Pfaff et al., "Lagrangian Vortex Sheets for Animating Fluids", ACM Transactions on Graphics, Jul. 2012, 8 pages.
International Preliminary Report on Patentability in PCT Application No. PCT/US2018/033226 dated Nov. 28, 2019. 7 pages.

* cited by examiner

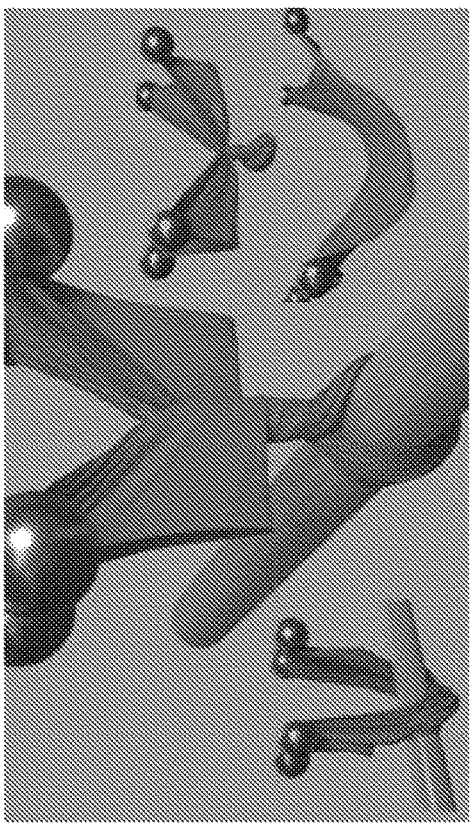
FIG. 3
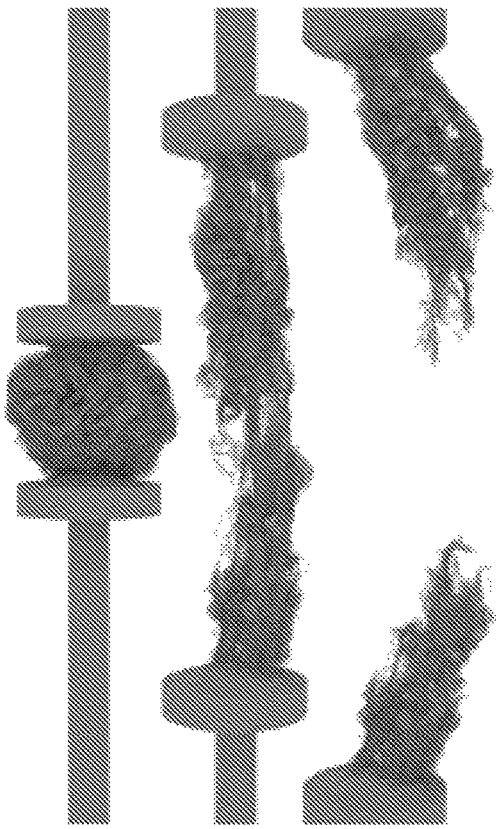
FIG. 4
FIG. 6
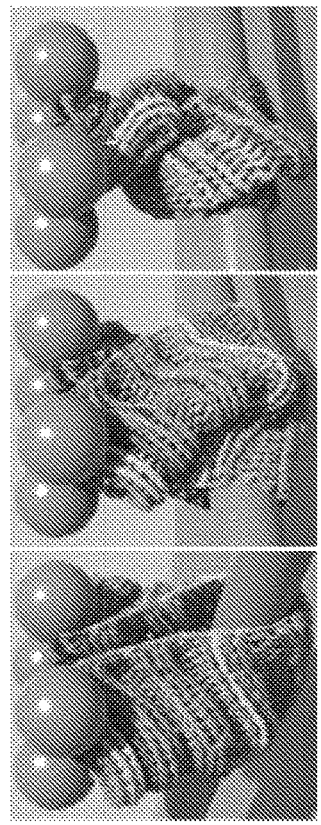
FIG. 5

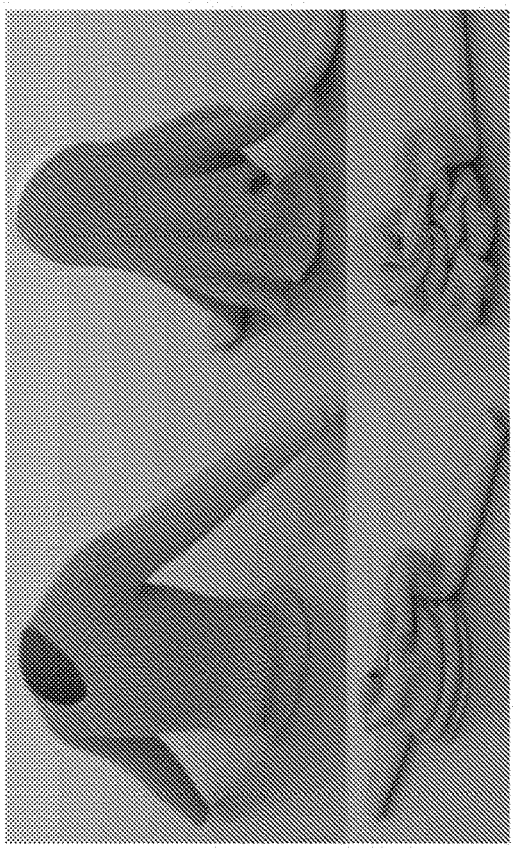
FIG. 7
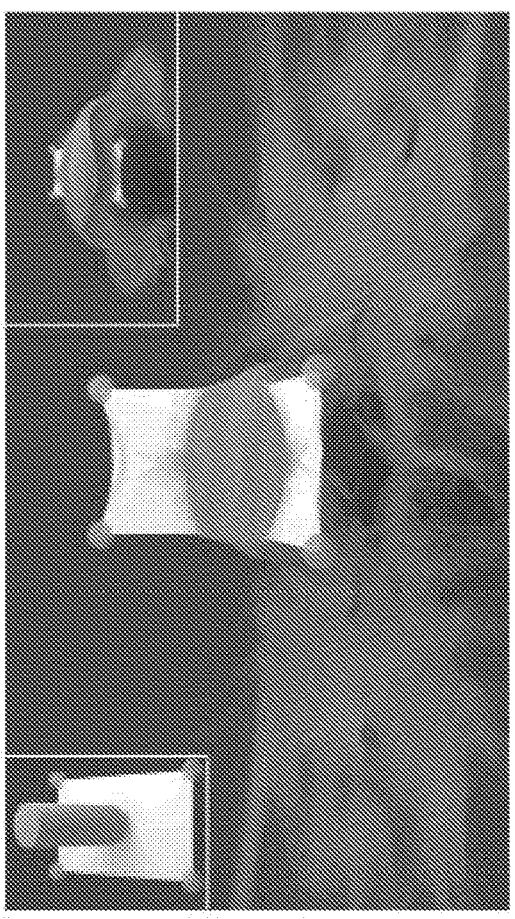
FIG. 9
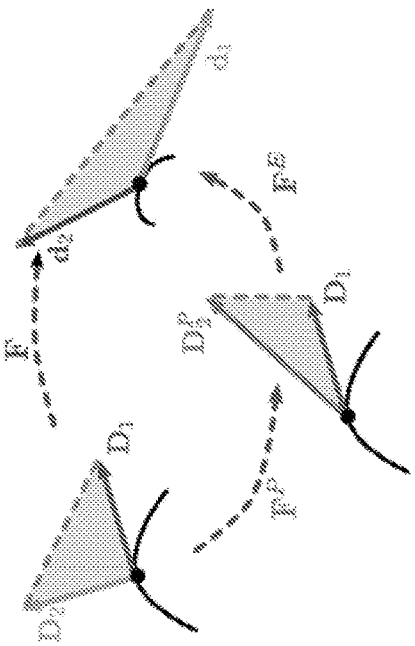
FIG. 8
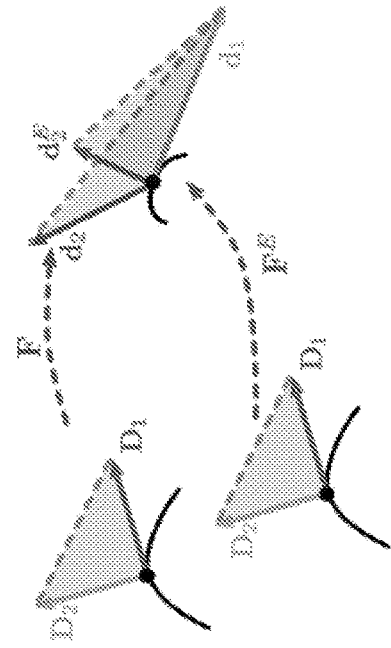

COMPUTERIZED RENDERING OF OBJECTS HAVING ANISOTROPIC ELASTOPLASTICITY FOR CODIMENSIONAL FRICTIONAL CONTACT

CROSS-REFERENCE TO RELATED APPLICATION

This application is a National Stage Entry of International Application No. PCT/US2018/033226, filed May 17, 2018, which claims the benefit of and priority to U.S. Provisional Application No. 62/507,740, filed May 17, 2017, the contents of which are incorporated herein by reference in their entirety.

STATEMENT REGARDING FEDERALLY SPONSORED RESEARCH OR DEVELOPMENT

This invention was made with government support under W81XWH-15-1-0147 awarded by the U.S. Army, Medical Research and Materiel Command. The government has certain rights in the invention.

TECHNICAL FIELD

The present disclosure relates to a physically based animation, and more particularly to a computerized simulation of 3-dimensional (3D) objects having elastic surfaces or curves.

BACKGROUND

Physically based animation is used to simulate physically plausible behaviors of objects. The techniques of physically based animation are particularly concerned with physical plausibility, numerical stability, and visual appeal of the objects being simulated or animated. The techniques of physically based animation include simulations of, e.g., rigid bodies (e.g., metal objects, rocks), soft bodies (e.g., muscle, fat, hair, vegetation, clothing, fabric), fluid (e.g., water), particles (e.g., smoke, fire, moving water, cloud, snow, dust, stars), as well simulations of complex behaviors of various objects (e.g., humans, animals, plants, clothing, etc.) and interactions between objects.

BRIEF DESCRIPTION OF THE DRAWINGS

Aspects of the present disclosure are best understood from the following detailed description when read with the accompanying drawings. It is noted that various features may not be drawn to scale, and the dimensions of the various features may be arbitrarily increased or reduced for clarity of discussion.

FIG. 3 illustrates a simulation of a piece of cloth interacting with a ball, where the piece of cloth with 2M triangles falls onto a rotating sphere, and low friction on the ground and high friction on the sphere causes detailed wrinkles and folds.

FIG. 4 illustrates a simulation of a piece of cloth being twisted, where the piece of cloth with 1.14M triangles is twisted by a cylinder. The simulation may run at 1.3 minutes per frame on average.

FIG. 5 illustrates a simulation of twisting a knitted cloth with a cylinder. The method handles detailed contacts between individual yarn threads under tension as well as macroscopic collision between yarns as demonstrated by this knitted cloth being twisted. Complex per-yarn motion is well resolved through elastoplasticity.

FIG. 6 illustrates a simulation of tearing apart a fibrous material. The method may capture many intricate features of tearing apart the fibrous material comprising, e.g., 2.15M particles.

FIG. 7 illustrates a simulation of dropping a knit sweater, where the sweater is dropped onto a rising sphere, stretched and then folded on the ground. The simulation may take 13 seconds per frame.

FIG. 8 illustrates a simulation of a curve in a 2-dimensional (2D) space. The left figure shows F being decomposed into $F^P$, a forgotten sliding and separation, and $F^E$ the remembered stretching, collision and shearing. The right figure shows that $F^E$ deforms $D_1$ and $D_2$ into $d_1$ and $d_2^E$.

FIG. 9 illustrates a simulation of a two-way coupling between 7M sand grains and a piece of elastic cloth.

DETAILED DESCRIPTION

Figure 1:
FIG. 1 illustrates a simulation of a sand column being coupled with a piece of cloth. The left figure illustrates three pieces of cloth with around 1.4 million (M) triangles pushed back and forth by a sphere, revealing intricate folds and contact. The right figure illustrates 7M (millions) colored sand grains coupled with elastic cloth, exhibiting beautiful flow patterns.

Common reference numerals are used throughout the drawings and the detailed description to indicate the same or similar components. Embodiments of the present disclosure will be readily understood from the following detailed description taken in conjunction with the accompanying drawings.

Various embodiments of the present disclosure are discussed in detail below. It should be appreciated, however, that the embodiments set forth many applicable concepts that can be embodied in a wide variety of specific contexts. It is to be understood that the following disclosure provides many different embodiments or examples of implementing different features of various embodiments. Specific examples of components and arrangements are described below for purposes of discussion. These are, of course, merely examples and are not intended to be limiting.

Embodiments, or examples, illustrated in the drawings, are disclosed below using specific language. It will nevertheless be understood that the embodiments and examples are not intended to be limiting. Any alterations and modifications of the disclosed embodiments, and any further applications of the principles disclosed in this document, as would normally occur to one of ordinary skill in the pertinent art, fall within the scope of this disclosure.

In addition, the present disclosure may repeat reference numerals and/or letters in the various examples. This repetition is for the purpose of simplicity and clarity and does not in itself dictate a relationship between the various embodiments and/or configurations discussed.

According to at least some embodiments of the present disclosure, computerized simulation method of elastic surface or curve involves a hybrid approach combining a Lagrangian approach and an Eulerian approach. The computerized simulation method can be used for applications such as computer-generated imagery for rendering 3-dimensional (3D) objects in graphics, animations, videos, movies, video games, etc.

In some embodiments, an elastic surface or curve simulation method involves, e.g., a Lagrangian approach and includes three components: time integration, collision detection and collision response. The Lagrangian approach allows for tracking of the codimensional manifold. However, collision may be detected and resolved separately. In some embodiments, an elastic surface or curve simulation method involves, e.g., an Eulerian method, for which the collision processing is automatic. The Eulerian method may be effective for volumetric objects. However, advection of a codimensional manifold may be relatively inaccurate. The term "codimensional" refers to objects of submanifolds (e.g., less dimensions) in a space of manifolds (e.g., more dimensions). For example, a hair line (1 dimension) or a piece of paper (2 dimensions) can be a codimensional object simulated and visualized in a 3-dimensional space.

In some embodiments, a hybrid approach, combining a Lagrangian approach and an Eulerian approach, defines the collision response with an elastoplastic constitutive model. For example, an anisotropic hyperelastic constitutive model separately characterizes the collision response to manifold strain as well as shearing and compression in the directions orthogonal to the manifold. The model is discretized with a Material Point Method (MPM) and a codimensional Lagrangian/Eulerian update of deformation gradient. The hybrid approach can simulate a large number of collisions in a short time frame. For example, in some embodiments, collision intensive scenarios with millions of degrees of freedom may take a few minutes per frame (or less). In some embodiments, examples of collision intensive scenarios with up to one million degrees of freedom may run in less than thirty seconds per frame (or less).

1. Introduction

Computer graphics may involve physically based animation of elastic surfaces and curves. For example, elastic surfaces and curves can include, e.g., layers of clothing in a virtual garment, individual strands in a head of hair, or yarns in a knit garment. Realistic simulation of collision and contact phenomena of these materials allows for richness and realism provided by physics based simulation. However, the thin nature of these materials may make collision detection and resolution challenging. The time-consuming process of collision detection and resolution of these materials can be the bottleneck in modern visual effects.

According to at least some embodiments of the present disclosure, an approach for codimensional elasticity that uses a hybrid Lagrangian/Eulerian Material Point Method (MPM) discretization is disclosed for modeling frictional contact of these granular materials with a continuum view. The elastoplastic description of the disclosed approach characterizes collision and/or contact response in the continuum and does not necessarily include separate post-processing (although post-processing is also feasible).

In some embodiments, codimensional elastic objects are naturally represented with a Lagrangian mesh. With the Lagrangian mesh model, individual particles are tracked and mesh polygons or segments are used to approximate the spatial derivatives of the material deformation mapping (also referred to as the deformation gradient). The mechanics of elasticity are naturally discretized with this Lagrangian view. However, additional modeling may be used to model the effects of self and external contact since these phenomena may cause interactions between distant regions in the mesh. For example, mesh facets such as points and triangles or segment pairs may not pass through one another over a time step. These constraints may be satisfied by some means external to the elasticity modeling. This can be done in number of ways including, e.g., repulsion penalties, impulsive change in momenta, and/or linear complimentary formulations of the constrained dynamics.

In some embodiments, in an Eulerian view, discrete samples of the solution are computed on a stationary background grid as material advects through the domain. While Lagrangian methods may involve two different components of the computation procedure: elasticity modeling and collision and/or contact resolution, Eulerian methods typically do not. The constitutive behavior of contact is expressed as that of the material itself. For example, for free-surface incompressible flow, no self-collision model is imposed beyond the velocity divergence condition specified to enforce incompressibility. In some embodiments, Eulerian methods may be used for collision and contact treatment for elastic materials. For elastic objects, accurate treatment of advection may be used to preserve an accurate rest state of the material, e.g. treatment for volumetric objects. However, Eulerian methods may face challenges for codimensional elasticity.

The disclosed hybrid approach combines the benefits of the Lagrangian and Eulerian approaches. For example, Particle-In-Cell (PIC) approaches like FLIP and MPM may combine a Lagrangian form of advection with a regular grid momentum update. In some embodiments, contact modeling may be simplified with Lagrangian methods, or the advection accuracy may be improved with Eulerian methods. For example, FLIP and Eulerian incompressibility may be used to efficiently model self-collision for hair. In a hybrid approach, Lagrangian hair velocities may be smoothed on an Eulerian grid. A hybrid approach may define interaction penalties and constraints for Lagrangian objects after mapping mass, momentum and density to an Eulerian grid. MPM has some similarities to this approach and may allow for the simulation of a wide range of elastoplastic materials in contact without a separate model for collision. For example, volumetric hyperelastic objects in contact with MPM may be simulated. Frictional contact for sand, for example, may be modeled with a hybrid discretization of an appropriate plastic flow.

According to at least some embodiments of the present disclosure, a hybrid approach may combine Lagrangian and Eulerian MPM methods, for modeling contact and collision via elastoplasticity of granular materials, and may be used to model volumetric objects. In some embodiments, MPM may update the deformation gradient on each particle independently with an Eulerian view. However, this may lead to numerical plasticity and failure. While these phenomena may useful for simulating elastoplasticity with failure, it is desirable to avoid these phenomena for simulating hyperelastic objects. To prevent numerical plasticity and failure, the disclosed hybrid approach tracks the deformation of codimensional elastic objects in a Lagrangian way.

However, in some embodiments, some approaches allowing for self-collision with volumetric objects may not be suitable for modeling codimensional objects. For non-volumetric objects such as codimensional objects, the Lagrangian update of deformation may track components in the manifold, but may not capture deformation in the orthogonal directions. It may be the elastic response to deformation in these directions that allows for frictional contact with volumetric objects in MPM simulations. The disclosed hybrid approach remedies the issue by updating the orthogonal components of the deformation gradient, e.g., in a standard MPM way.

Furthermore, in some embodiments, while relying on the elastic response alone may be sufficient for self-collision simulation with volumetric objects, it may lead to artificial cohesion (stickiness) and excessive friction for codimensional elasticity. The disclosed hybrid approach remedies this using a plastic flow that enforces a Coulomb friction inequality between shear and normal stresses in the directions orthogonal to the frictional surface or curve. The disclosed approach prevents plasticity in the codimensional manifold, which may be purely elastic. The disclosed approach defines the elasticity in an anisotropic way so that the response in the surface or curve cleanly relates to the response in the orthogonal directions.

In some embodiments, the disclosed approach is computationally efficient, at least partially due to the simplicity of handling contact and collision through the constitutive modeling. Furthermore, the disclosed approach inherently and naturally allows for coupling with multiple materials. For example, the disclosed approach can simulate a range of coupled elastic surfaces and curves, fluids and granular materials with, e.g., millions of degrees of freedom in, e.g., a few minutes per frame. The disclosed approach may involve both implicit and explicit versions of the grid based momentum update in MPM. For explicit time stepping, the disclosed approach uses a damping model that may not penalize rigid motions and may not impact the time step restriction.

In some embodiments, the disclosed approach use elasticity models that cleanly relate the elastic response in the surface or curve to the response in the orthogonal directions.

Anisotropic plasticity models are used to characterize frictional contact with elastic surfaces and curves. A return mapping procedure is used to temporally discretize the plastic flow. A hybrid version of Lagrangian and Eulerian MPM discretization is used for updating the deformation gradient. The disclose approach involves an explicit damping model that may not penalize rigid modes.

2. Relevant Techniques
2.1 Simulation of Clothing

In some embodiments, clothing simulation may use dynamically defined stiff springs that prevent cloth-cloth penetration and apply an implicit integration scheme for efficiency. A semi-implicit treatment may be used to efficiently handle buckling instabilities. Collisions for point/triangle and edge/edge pairs in the mesh may be processed via impulsive response. Asynchronous variational integration may be combined with kinetic data structures. Collision resolution may be processed with barrier potentials which efficiently approximate with nested families of quadratic potentials. An implicit treatment of complimentary collision constraints and a solver for large mixed linear complementarity problems may be used. Implicit time stepping for cloth may be performed efficiently via optimization with auxiliary variables representing strain.

2.2 Simulation of Yarn and Knits

Elastic curves representing individual yarns may be used to create knit garments. Infrequently updated locally co-rotated linear approximations of the barrier potential may be used to provide a speed up of, e.g., fivefold. Warp/weft intersections may be resolved with a point that connects the two curves.

2.3 Simulation of Hair

In some embodiments, hair may be modeled with various elasticity models per strand. In some other embodiments, hair may also be modeled as inextensible. For example, Kirchhoff elastic rod models may be used, which naturally enforce inextensibility. Frictional effects may be included in the hair modeling. In some embodiments, impulse-based collision models for elastic rods may lead to instabilities via excitation of stretching modes, and an adaptively nonlinear model for collision may lead to robust and accurate simulations.

2.4 Parallel Computing

A distributed memory, parallel architecture may be used to simulate cloth meshes with, e.g., millions of triangles. Components of a cloth solver may be implemented on, e.g., one or more graphics processing unit (GPU). An implicit GPU implementation may adopt inelastic impact zone response. In some embodiments, central processing unit (CPU) and/or GPU level parallelism may be used for simulation. In some embodiments, the asynchronous contact mechanics approaches may be accelerated by, e.g., 12 times with a 384-core Cray XC30 parallel supercomputer.

2.5 Reduced and Adaptive Models

In some embodiments, reduced models may be used for simulating clothing at interactive rates in many scenarios. In some embodiments, a reduced model driven by high-resolution simulation data can be used to simulate hair, e.g., up to 150 thousand strands in real-time. Adaptivity has also been shown to produce simulation detail at modest cost.

2.6 Eulerian and Continuum Collision and Contact

In some embodiments, an Eulerian approach may be used to simulate viscoelastic materials without need for explicit contact modeling. In some embodiments, an Eulerian approach may be used to advect the reference configuration to volumetric elastic object simulation that may reduce the complexity of collision modeling. In some embodiments, hyperelastic solids can by handled by being coupled with incompressible fluids. In some embodiments, an Eulerian view of hyperelastic surfaces is used to model skin and tissue contact. In some embodiments, continuum friction models may be used for collision models of, e.g., crowd interactions. In some embodiments, a hybrid Lagrange and Eulerian PIC/MPM approach may be used for, e.g., sand animation. In some embodiments, MPM may be used for various elastoplastic materials. In some embodiments, the space surrounding elastic objects may be modeled by a mesh and an incompressibility constraint may be enforced on the mesh. In some embodiments, hair volume meshes may be used to simulate hair in real time. In some embodiments, meshes with dynamic connectivity may be used for collision processing. In some embodiments, the simulation involves modeling of both constitutive response and collision via constraints. In some embodiments, continuum fluid concepts may be used to accelerate collision processing for, e.g., hair.

3. Modeling of Codimensional Objects

According to at least some embodiments of the present disclosure, a disclosed hybrid approach models codimensional objects as volumetric elastoplastic continua. In some embodiments, at least some objects being modeled have thin surfaces or even curves in 3D. The dynamics of the objects may be modeled as if they have appreciable thickness in a continuum. The state of an object may be described at each location by its density $\rho(x,t)$ and velocity $v(x,t)$. The governing equations are based on conservation of mass and momentum:

$$\frac{D\rho}{Dt} + \rho \nabla \cdot v = 0, \rho \frac{Dv}{Dt} = \nabla \cdot \sigma + \rho g. \quad (1)$$

where $\sigma$ is the stress, g is gravity and $$\frac{D}{Dt}$$

is the material derivative.

3.1 Deformation Gradient

The material deformation may be characterized in terms of the flow map $\phi$, which maps points in the original configuration of the material X to points in the time t configuration x as $\phi(X,t)=x$. The Jacobian of this mapping $$F = \frac{\partial \phi}{\partial X}(X, t)$$

may be referred to as deformation gradient, which represents the local deformation of the material. That is, the deformation gradient yields the best local linear approximation to the mapping: $\phi(\tilde{X}, t) \approx F(\tilde{X}-X)+x$ for $\tilde{X}$ near X. For example, if the material is undeformed local to X then F will be a rotation. If $\det(F)<1$, the material loses volume locally; if $\det(F)>1$, it gains volume locally.

Codimensional deformation may be expressed via components of F. Material directions $D_1, D_2, D_3$ are defined at point X. In the case of elastic surfaces, $D_1$ and $D_2$ are tangent to the initial configuration of the surface and $D_3$ is normal to the surface. In the case of curves, $D_1$ is tangent to the curve and $D_2$ and $D_3$ are orthogonal to $D_1$.

Defining $d_i=FD_i$, i=1, 2, 3, $d_i$ represents the local direction and stretching of material in the $D_i$ direction under the flow map $\phi$. Thus for curves, deformation in the manifold may be expressed via $d_1$; for surfaces, deformation in the manifold may be expressed via $d_1$ and $d_2$. The remaining $d_i$ represents the deformation of material normal to the manifold. Thus, the model can account for deformation in the manifold, deformation normal to the manifold and shearing of material relative to the manifold, in terms of the $d_i$ and their relation to one another. For example for surfaces, while $D_3$ is normal to the initial surface, $d_3$ will not be normal when there is a shearing motion relative to the manifold. For example, FIG. 8 illustrates modeling of a curve in a 2-dimensional (2D) space.

3.2 Codimensional Anisotropic Plasticity

In some embodiments, large strain elastoplasticity may be modeled by factoring the deformation gradient into elastic and plastic parts as $F=F^E F^P$. The plastic part $F^P$ may represent deformation history that has been lost and may no longer be penalized elastically. The elastic part $F^E$ may remain and may be penalized elastically. A hyperelastic potential energy density may be used, which increases with increasing deformation in $F^E$.

In some embodiments, frictional contact may be modeled with elastoplasticity. However, unlike for granular materials where collision may occur in any direction local to a grain, the modeling of the elastic surface or curve may consider contact to occur in the direction orthogonal to the elastic surface or curve. Therefore, the plasticity may modify the codimensional components of the deformation. The mechanical response to deformations in the manifold may be purely elastic, which places an anisotropic constraint on the multiplicative decomposition. To guarantee that deformation in a curve is purely elastic, the plasticity model may satisfy $FD_1=F^E D_1$ (equivalently $D_1=F^P D_1$). To guarantee that the deformation in a surface is purely elastic, the model may additionally satisfy $FD_2=F^E D_2$ (equivalently $D_2=F^P D_2$). By satisfying these constraints, the model guarantees that the non-rigid deformation of the surface or curve is penalized elastically. In some embodiments, plasticity may be allowed just to affect the components of the deformation that provide compression, extension and shearing in directions normal to the manifold.

3.3 Codimensional Anisotropic Elasticity

In some embodiments, the disclosed approach may use a model that is hyperelastic in $F^E$, where the elastic potential energy density increases with deformation of the elastic part of the deformation gradient. The Cauchy stress in the material may be $$\sigma = \frac{1}{\det(F)} \frac{\partial \psi}{\partial F^E} F^{E^T}.$$

Here $\psi(F^E)$ is the elastic energy density for penalizing non-rigid $F^E$. In some embodiments, the elastic energy density may serve at least two purposes. First, the elastic energy density may express the resistance to deformations that change the shape of the surface or curve manifold. Also, the elastic energy density may define the resistance to contact and frictional sliding. In the case of codimensional elasticity, the resistance is due to deformations normal to the manifold. The anisotropic energy density may take this dual nature into account.

In some embodiments, the potential with respect to the local material directions $D=[D_1, D_2, D_3]$ may be defined as $\psi(F^E, D)$. In some embodiments, the elastic potential may be invariant under world space rotations. Thus, the model is free to choose a convenient basis. In some embodiments, one choice may be given by orthogonalizing the vectors $d_i^E = F^E D_i$, the elastically deformed material directions, with the Gram-Schmidt process to obtain $Q = [q_1, q_2, q_3]$. Equivalently, $QR = F^E D$ is the QR-decomposition of $F^E D$. The model may define $\psi(F^E, D) = \hat{\psi}(R)$. This is similar to the isotropic case where the additional material frame invariance allows a model to choose $u_i$ and $v_i$ such that $F^E v_i = \sigma_i u_i$, and define $\psi(F^E) = \hat{\psi}(\Sigma)$.

In some embodiments, another common stress measure may be the first Piola-Kirchhoff stress, defined as $$P = \frac{\partial \psi}{\partial F^E}(F^P)^{-T},$$

and related to σ with $$\sigma = \frac{1}{J} P F^T.$$

If $F^E D$ is denoted with $d^E$, then $$\frac{\partial \psi}{\partial F^E} = \frac{\partial \psi}{\partial d^E} D^T.$$

Thus, $$\frac{\partial \psi}{\partial d^E} = Q(T(K) + T(K)^T - D(K))R^{-T},$$

where $$K = \frac{\partial \hat{\psi}}{\partial d^E} R^T.$$

Here T and D are operators on matrices that keep upper triangular part and diagonal part respectively.

3.3.1 Codimensional Anisotropic Elasticity for Curves

Elastic curves may be modeled with rotational material symmetry around the fiber direction $D_1$. In other words, for curves, the material directions $D_2$ and $D_3$ may be regarded as essentially arbitrary, and any choices which are mutually orthogonal with $D_1$ may give the same potential. Guided by this material symmetry, $R = R_3 R_2 R_1$ may be decomposed into a composition of three deformations, where the first ($R_1$) is a stretching of the fibers, the second ($R_2$) is a shearing of the fibers and the third ($R_3$) is a deformation of the cross section of the fibers:

$$R_1 = \begin{bmatrix} r_{11} & 0 & 0 \\ 0 & 1 & 0 \\ 0 & 0 & 1 \end{bmatrix}, R_2 = \begin{bmatrix} 1 & r_{12} & r_{13} \\ 0 & 1 & 0 \\ 0 & 0 & 1 \end{bmatrix}, R_3 = \begin{bmatrix} 1 & 0 & 0 \\ 0 & r_{22} & r_{23} \\ 0 & 0 & r_{33} \end{bmatrix}.$$

Based on the decomposition, the elastic potential for curves may be expressed as a sum of 3 terms $\hat{\psi}(R) = f(R_1) + g(R_2) + h(R_3)$. The first term $$f(R_1) = \frac{k}{2}(r_{11} - 1)^2$$

penalizes change of fiber length. The second term $$g(R_2) = \frac{\gamma}{2}(r_{12}^2 + r_{13}^2)$$

penalizes shearing along the fibers. In absence of other deformations, a cross section of the fibers may behave like material in frictional contact, resisting compression and shearing. Thus, the third term $h(R_3)$ may be a form of a two dimensional elastic potential, since it naturally enforces the frictional contact (when combined with appropriate plasticity law). That is, $$h(R_3) = \mu(\epsilon_1^2 + \epsilon_2^2) + \frac{\lambda}{2}(\epsilon_1 + \epsilon_2)^2,$$

where $\epsilon_1$ and $\epsilon_2$ are the logarithms of the nontrivial singular values of $R_3$.

3.3.2 Codimensional Anisotropic Elasticity for Surfaces

For the elastic surface energy, the surface may be assumed as being isotropic, e.g., the potential is invariant under rotation of the material directions $D_1$ and $D_2$. Similarly, $R = R_3 R_2 R_1$ is decomposed into a composition of three deformations. The first ($R_1$) is an in-plane deformation of the surface. The second ($R_2$) is a shearing of surface normal. The third ($R_3$) is a compression or stretching of the surface normal:

$$R_1 = \begin{bmatrix} r_{11} & r_{12} & 0 \\ 0 & r_{22} & 0 \\ 0 & 0 & 1 \end{bmatrix}, R_2 = \begin{bmatrix} 1 & 0 & r_{13} \\ 0 & 1 & r_{23} \\ 0 & 0 & 1 \end{bmatrix}, R_3 = \begin{bmatrix} 1 & 0 & 0 \\ 0 & 1 & 0 \\ 0 & 0 & r_{33} \end{bmatrix}.$$

The energy may be expressed as a sum of three terms, $\hat{\psi}(R) = f(R_3) + g(R_2) + h(R_1)$. The first term $f(R_3)$ may penalize compression of the material in the normal direction, since the surface may be mostly surrounded by empty space which can expand freely:

$$f(R_3) = \begin{cases} \frac{k}{3}(1 - r_{33})^3 & r_{33} \leq 1 \\ 0 & r_{33} > 1 \end{cases}.$$

The second term may be a form of $$g(R_2) = \frac{\gamma}{2}(r_{13}^2 + r_{23}^2)$$

to penalize shearing of the normal to the surface. The third term $h(R_1)$ may use a two dimensional version of a fixed corotated potential to penalize deformation of the surface. Although in some embodiments, any in-plane energy may be used, with no change except to the stress and stress derivatives.

3.4 Friction and Plastic Yield Condition

With Coulomb friction, the frictional force $f_f$ may be smaller than a constant $c_F$ (the coefficient of friction) times the normal force $f_n$: $f_f \le c_F f_n$. In a continuum view, at a given point x in world space and a normal vector n, the traction vector t represents the local force per area that the material on one side of the plane with normal n exerts on the other side. The traction may have normal and shearing components $f_n = -n^T t$ and $f_s = s(n, \theta)^T t$ respectively where $s(n, \theta)$ is an arbitrary vector in the plane with normal n, and $\theta$ indicates its direction in the plane. Note that in the convention here, the compressive force $f_n$ may be positive as in the Coulomb model. If the material is in frictional contact in direction n, then $f_f = f_s$ is the component of the frictional response in the direction $s(n, \theta)$ and for angles $\theta$, and the inequality $s(n, \theta)^T t \le c_F f_n$ may be satisfied.

The traction may be expressed in terms of the Cauchy stress $\sigma$ as $t = \sigma n$, showing that the Coulomb model places constraints on the stress: $s(n, \theta)^T \sigma n + c_F n^T \sigma n \le 0$ for all $\theta$ given frictional contact direction n. In the case of a grain, contact may be assumed to happen in all directions. For elastic surfaces or curves (e.g. clothing), the model considers the directions orthogonal to the manifold to be in frictional contact. Together with the choice of elastic potential, this results in a less restrictive constraint that does not affect elastic deformation in the manifold. For frictional contact between surfaces, the model may consider contact in the direction normal to the surface: $n = q_3$. For curves, there is a two dimensional normal space spanned by $q_2$ and $q_3$ and thus contact in all directions are considered $n = \cos(\hat{\theta}) q_2 + \sin(\hat{\theta}) q_3$.

In order to satisfy the stress constraints the material will yield. Physically this yielding may manifest as the cloth or fibers sliding, and "forgetting" some of the shearing deformation. This "forgetting" occurs by some of the incremental deformation being stored in $F^P$ as opposed to $F^E$, as the stress is a function of $F^E$ and not $F^P$.

4. Discretization

In some embodiments, the disclosed approach may include MPM discretization, which translates from the theoretical continuum equations into a computation procedure for codimensional elasticity with contact. PIC and MPM may be hybrid particle/grid methods. From the continuum point of view, the particles represent discrete samples of the continuous material and the grid is a helper for computing their physical interactions. For example, for sands, the particles may be rendered as individual grains and the grid update, whose essential features are inherited from the continuum, which can be seen as a means for processing their frictional contact interactions. However, for codimensional elasticity, the continuum samples may be modeled as coherent surface or curve meshes, rather than as unstructured particles, which is different from other MPM approaches.

The disclosed MPM discretization may model self-collision and its ramifications in the grid momentum updates, as well as the associated elasticity and plasticity updates. In some embodiments, the discretization procedure may include:

(1) Transfer to grid: transferring mass and momentum from particles to the grid, and dividing grid momentum by grid mass to define grid velocity.

(2) Update grid momentum: using either explicit symplectic Euler or backward Euler to update grid momentum.

(3) Transfer to particles: using APIC to transfer velocities and affine matrices from grid to particles.

(4) Update particles: updating particles positions and deformation gradients.

(5) Update plasticity: projecting the deformation gradient for plasticity, and updating the elastic and plastic parts.

4.1 Lagrangian State

Figure 11:
FIG. 11 illustrates a simulation of particles of different classifications, including Material Point Method (MPM) particles, Lagrangian mesh vertex particles, and Lagrangian mesh element quadrature particles.

In some embodiments, the Lagrangian particle state may be the primary representation of material for MPM. Particles can be classified as: (i) traditional MPM particles, (ii) Lagrangian mesh vertex particles, or (iii) Lagrangian mesh element quadrature particles (e.g., see FIG. 11). Type (ii) particles may be used to track the in-manifold deformation of the elements. Type (iii) particles may be used to track to the codimensional deformation in an updated Lagrangian manner.

At time $t^n$, the model stores the particle positions $x_p^n$, velocities $v_p^n$, initial mass $m_p$, elastic deformation gradient $F_p^{E,n}$, initial volume $V_p^0$, affine velocity $C_p^n$ and undeformed material directions $D_p$. In some embodiments, $D_p$ is not stored for particles of type (i) and (ii). $F_p^{E,n}$ is not stored for particles of type (ii). The mass is set as $m_p = \rho V_p^0$, and $V_p^0$ is set according to the total volume divided by the number of particles for type (i) particles. For particles of type (ii) and (iii), the volume of each triangle or segment is divided equally among the type (ii) and type (iii) particles incident to it, and then is added to each particle's $V_p^0$.

Here the notation $I^{(i)}$, $I^{(ii)}$, $I^{(iii)}$ may be used to represent the sets of particle indices of types (i), (ii) and (iii) respectively. E.g. for any particle index p, the particle is in one of $I^{(i)}$, $I^{(ii)}$ or $I^{(iii)}$, depending on its type.

4.2 Grid Transfers

4.2.1 Particle to Grid

In some embodiments, the particle mass and momentum may be transferred to the grid using, e.g., APIC. Each particle p and grid node i is associated with a weight $w_{ip}^n = N(x_p^n - x_i)$, where $x_i$ is the location of the grid node and $N(x)$ are linear, quadratic or cubic b-spline kernels. The weights define the contribution of quantities on particle p to grid node i. The mass contribution from particle p to grid node i is $w_{ip}^n m_p$. The total mass on grid node i is a sum of the contributions from particles $m_i^n = \Sigma_p w_{ip}^n m_p$.

With APIC, each particle also stores matrix $C_p^n$ to define an affine velocity local to the particle. With this convention, the momentum contribution from particle p to node i is $w_{ip}^n m_p (v_p^n + C_p^n (x_i^n - x_p^n))$. For each grid node i, a sum of the contribution from particles p is generated for grid momentum and then is divided by the grid mass to generate the grid velocity as $$v_i^n = \frac{1}{m_i^n} \Sigma_p w_{ip}^n m_p (v_p^n + C_p^n (x_i^n - x_p^n)).$$

4.2.2 Grid to Particle

After the update of grid node momentum, the grid velocities are transferred to particles. $\tilde{v}_i^{n+1}$ denote grid node velocities after the momentum updates. The grid to particle transfer with APIC may be written as $v_p^{n+1} = \Sigma_i w_{ip}^n \tilde{v}_i^{n+1}$ and $$\tilde{C}_p^{n+1} = \Sigma_i w_{ip}^n \tilde{v}_i^{n+1} \left( \left( \frac{6 - b^d}{h^2} \right) (x_i^n - x_p^n) \right)^T,$$

where $b^d$ is the b-spline degree ($b^d = 3$ for cubic b-spline interpolation, $b^d = 2$ for quadratic b-spline interpolation) and h is the Eulerian grid spacing. For the linear kernel, $\tilde{C}_p^{n+1}$ reduces to the velocity gradient. In that case, it can be computed as $\tilde{C}_p^{n+1} = \Sigma_i \tilde{v}_i^{n+1} (\nabla w_{ip}^n)^T$.

For MPM particles and Lagrangian mesh vertex particles, the positions are updated with $x_p^{n+1} = x_p^n + \Delta t v_p^{n+1}$. The positions of Lagrangian mesh element quadrature particles are confined to (or around) the barycenters of their corresponding Lagrangian elements to prevent drifting that may occur with a MPM update of these positions.

4.2.3 Dampening

In some embodiments, the Rigid Particle-in-Cell (RPIC) may be treated as a reduced APIC scheme that damps out stretching and shearing motions while conserving rigid velocity modes. APIC degrades to RPIC if just the skew symmetric part of $\tilde{C}_p^{n+1}$ is kept. Furthermore, if $\tilde{C}_p^{n+1}$ is decomposed into the symmetric part $\tilde{C}_p^{n+1,s}$ and the skew symmetric part $\tilde{C}_p^{n+1,k}$, the model may stably introduce damping to the system by scaling $\tilde{C}_p^{n+1,s}$:

$$C_p^{n+1} = \tilde{C}_p^{n+1,k} + (1-v)\tilde{C}_p^{n+1,s}, \qquad (2)$$

where $v \in [0, 1]$ is the damping coefficient. This allows controlling the damping on stretching and shearing without damping local or global rigid motions. In some embodiments, any value of v may be chosen depending on how energetic a simulation is. In some embodiments, the damping scheme may damp non-rigid motion in a stable way without introducing any additional time step restriction. For example, the damping scheme may work with explicit symplectic Euler time stepping.

4.3 Deformation Gradient Update

In some embodiments, the continuum samples may be treated as coherent surfaces or curves, rather than as unstructured particles. The treatment may be applied to, e.g., elastic volumes and surfaces (without self-collision). In some embodiments, for the meshes, the Eulerian MPM update of the deformation gradient may be abandoned, and the mesh connectivity may be used to compute the manifold components of the deformation gradient. This approach may also be applied to triangulated surfaces and segmented curves. This allows for a Lagrangian update of the deformation gradient that does not suffer from the numerical plasticity or fracture of the Eulerian update. The approach allows for coupling of Lagrangian elastic meshes with MPM materials. However, self-contact with codimensional meshes may not be well resolved.

Figure 10:
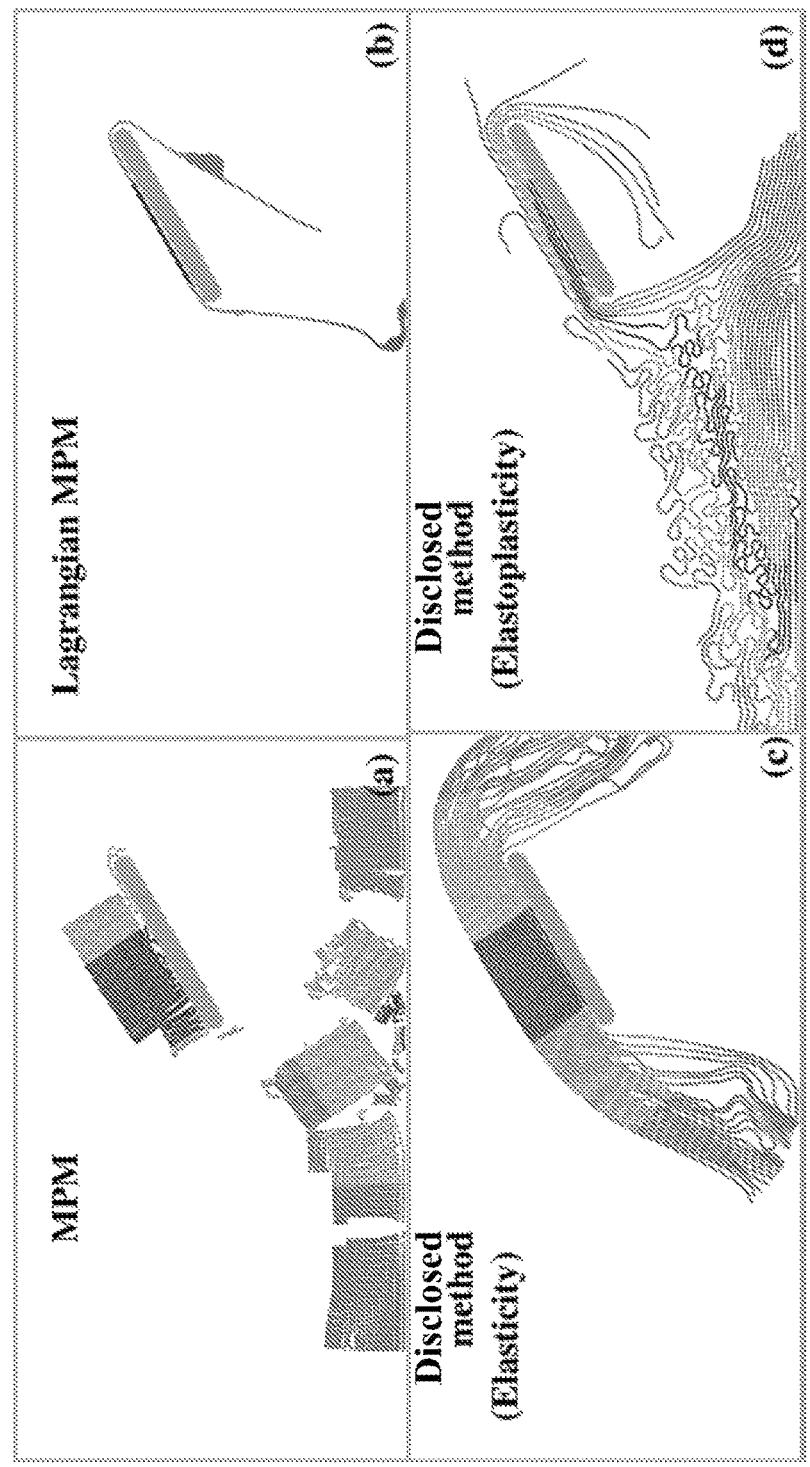
FIG. 10 illustrates effects of different choices of deformation gradient discretization as well as the effect of plasticity in a fiber piling example. (a) shows MPM deformation gradient; (b) shows the codimensional Lagrangian deformation gradient; (c) shows the disclosed model without plasticity; (d) shows the disclosed full elastoplasticity model.

In some embodiments, the disclosed approach further introduces an Eulerian deformation of the grid, to obtain the full rank deformation gradient. Thus, the disclosed approach allows for penalizing self-contact, while still preventing numerical plasticity and fracture. A comparison of the approaches with or without Eulerian deformation of the grid is shown in FIG. 10.

In some embodiments, the deformation gradient may be updated in terms of the motion of the grid over a time step. The motion of the grid may be described in terms of $x_i$, the Eulerian grid nodes at the beginning of the time step and $\hat{x}_i$ their location after a grid update. Although the grid may not be necessarily deformed, the grid momentum update may be treated in terms of the motion that it may cause on the grid. In particular, this allows defining the elastic grid forces through a differentiation of a potential. The use of incremental grid node motion is referred to as an updated Lagrangian view. In other words, the motion of the grid is treated as Lagrangian, albeit from the grid configuration at time $t^n$, instead of the rest configuration. Using $\hat{v}_i^{n+1}$ to denote the grid node velocity after the momentum update, the locations are updated $\hat{x}_i = x_i + \Delta t \hat{v}_i^{n+1}$. Using $\hat{x}, \hat{v}$ to denote the vector of all moved grid positions $\hat{x}_i$, and velocities $\hat{v}_i^{n+1}$ respectively, the deformation gradient update on particle p may be defined in terms of $\hat{F}_p^E(\hat{x})$.

For MPM particles (e.g., type (i)), the elastic deformation gradient may be updated as:

$$\hat{F}_p^E(\hat{x}) = (\nabla \hat{x})_p F_p^{E,n} \qquad (3)$$

where $(\nabla \hat{x})_p = \Sigma_i \hat{x}_i (\nabla w_{ip}^n)^T$ and $F_p^0 = I$, assuming no initial deformation. For mesh vertex particles (e.g., type (ii)), the deformation gradient may not be stored, so elastic deformation may not be updated. For a Lagrangian mesh element quadrature particle (e.g., type (iii)), $\hat{F}_p^E(\hat{x}) = \hat{d}_p^E D_p^{-1}$. Here $\hat{d}_p^E(\hat{x}) = [\hat{d}_{p,1}^E(\hat{x}), \hat{d}_{p,2}^E(\hat{x}), \hat{d}_{p,3}^E(\hat{x})]$ and $D = [D_{p,1}, D_{p,2}, D_{p,3}]$ are matrices whose columns are respectively the deformed elastic and initial material directions. For the $\zeta$ (e.g., 1 for curves and 2 for surfaces) directions tangent to the manifold, $D_{p,\beta} = X_{mesh(p,\beta)} - X_{mesh(p,0)}$, which corresponds to the undeformed mesh element edge vectors (where $\beta = 1, \ldots, \zeta$). Then $\hat{d}_{p,\beta}^E(\hat{x}) = \hat{d}_{p,\beta}(\hat{x}) = \hat{x}_{mesh(p,\beta)} - \hat{x}_{mesh(p,)}$, which are the deformed edge vectors. The deformed mesh particle positions are interpolated from the deformed grid node positions $\hat{x}_q = \Sigma_i \hat{x}_i w_{iq}^n$. In some embodiments, the directions $\hat{d}_{p,\beta}$ tangent to the manifold may not include superscript E since they may not experience plasticity. Also, the notation mesh(p,β) for β=0 ... ζ is used to denote the mesh vertex particle (type (ii)) indices of the mesh element corresponding to Lagrangian mesh element quadrature particle p. In some embodiments, the remaining 3-ζ directions $D_\beta$ may be of unit length and normal to the manifold, and may be evolved as in MPM via $$\hat{d}_{p,\beta}^E(\hat{x}) = (\nabla \hat{x})_p d_{p,\beta}^{E,n}. \qquad (4)$$

In some embodiments, $\hat{F}_p^E$ is updated ignoring any further plasticity. $\hat{F}_p^E$ may be further processed for plasticity to obtain $F_p^{E,n+1}$.

4.4 Grid Momentum Update

In some embodiments, the update of the grid node momentum (e.g., velocities since the grid node masses do not change in the update) may be described as: $v_i^n \to \hat{v}_i^{n+1}$. The hat in $\hat{v}_i^{n+1}$ distinguishes the update from the velocities that may be transferred to the grid in a next time step $v_i^{n+1}$. $\hat{x}$ and $\hat{v}$ denote the vector of all grid moved positions $\hat{x}_i$ and velocities $v_i^{n+1}$ respectively. The grid momentum update may be expressed as:

$$\hat{v}_i^{n+1} = v_i^n + \frac{\Delta t}{m_i^n} f_i(\hat{x}(\hat{q})) + \Delta t g, \qquad (5)$$

where f is the elastic force, g is the gravitational acceleration and $\hat{q} = 0$ for symplectic Euler or $\hat{q} = \hat{v}$ for backward Euler. The notation $\hat{x}(\hat{q})$ indicates the dependence of the moved grid nodes through $\hat{x}_i = x_i + \Delta t q_i^{n+1}$.

The elastic force f may be defined in terms of the elastic potential energy. Given elastic energy density $\psi$, the total potential may be computed as $\Phi = \int_\Omega \psi dV$ over material domain $\Omega$. When discretely approximated on particles, the total potential may be expressed as:

$$\Phi = \Sigma_{p \in t^{(i)} \cup t^{(iii)}} V_p^0 \psi(\hat{F}_p^E),$$

where $V_p^0$ is the undeformed volume of particle p. To compute grid node forces, $\Phi$ is differentiated as a function of $\hat{x}$. $\hat{F}_p^E$ is expressed as a function of $\hat{x}$. The force on node i is expressed as $$f_i(\hat{x}) = -\frac{\partial \Phi}{\partial \hat{x}_i} = -\Sigma_{p \in I^{(ii)} \cup I^{(iii)}} V_p^0 \frac{\partial \psi}{\partial F^E}(\hat{F}_p^E(\hat{x})) : \frac{\partial \hat{F}_p^E}{\partial x_i}. \quad (6)$$

$$\frac{\partial \hat{F}_p^E}{\partial x_i}$$

may be a third order tensor, and may not depend on $\hat{x}$ because $\hat{F}_p^E$ is linear in $\hat{x}_i$. In some embodiments, the tensor allows splitting the computation into three parts. The first part corresponds to MPM particles and the force is $$f_i^{(i)}(\hat{x}) = -\Sigma_{p \in I^{(i)}} V_p^0 \left( \frac{\partial \psi}{\partial F^E}(\hat{F}_p^E(\hat{x})) \right) : \frac{\partial \hat{F}_p^E}{\partial x_i}.$$

By expressing F using a material space coordinate frame which is aligned with the element, the first $\zeta$ columns of F may be assumed to correspond to in-manifold deformation. In other words, the first $\zeta$ columns of $$\frac{\partial \psi}{\partial F^E}$$

correspond to the stress response inside the manifold and these terms can be computed by first computing forces on Lagrangian mesh vertex particles (type (ii)) and then transferring them to the grid. Denoting these vertex forces with $f_p^{(ii)}(\hat{x})$, their corresponding contribution to grid node forces may be computed as $f_i^{(ii)}(\hat{x}) = \Sigma_{p \in I^{(ii)}} w_{ip}^n f_p(\hat{x})$. The last $3-\zeta$ columns of $$\frac{\partial \psi}{\partial F^E}$$

correspond to the normal space contribution. This part may be computed by summing over Lagrangian mesh element quadrature particles (type (iii)). Differentiating the last $\zeta$ columns of $\hat{F}_p^E(\hat{x})$ with respect to $\hat{x}_i$ may be handled similarly to MPM through $d_\beta^E(\hat{x}) = (\nabla \hat{x})_p d_\beta^{E,n}$. This contribution to the force may be expressed as $$f_i^{(iii)}(\hat{x}) = -\Sigma_{p \in I^{(iii)}} \sum_{\beta=\zeta+1}^{3} V_p^0 \frac{\partial \psi}{\partial F_\beta^E} d_\beta^T \nabla w_{ip}^n,$$

where $F_\beta^E$ denotes the $\beta^{th}$ column of $F^E$. With this view, the force is expressed as $f_i(\hat{x}) = f_i^{(i)}(\hat{x}) + f_i^{(ii)}(\hat{x}) + f_i^{(iii)}(\hat{x})$.

In some embodiments, when using backward Euler, the system may be modeled by utilizing the Hessian of $\Phi$ with respect to $\hat{x}$ and ignoring the effects of plasticity during the process. The action of this Hessian on an arbitrary increment $\delta u$ may be expressed as $$\delta f_{i\alpha} = \frac{\partial f_{i\alpha}}{\partial x_{j\lambda}} \delta u_{j\lambda} = -\Sigma_{p \in I^{(ii)} \cup I^{(iii)}} V_p^0 \frac{\partial F_{\beta\zeta}^E}{\partial x_{i\alpha}} \frac{\partial^2 \psi}{\partial F_{\beta\zeta}^E \partial F_{\omega\sigma}^E} \frac{\partial F_{\omega\sigma}^E}{\partial x_{j\lambda}} \delta u_{j\lambda},$$

where implicit summation may be used on repeated indices. In some embodiments, Newton's method may be used to solve the nonlinear system. In some embodiments, the effects of plasticity may be included in the implicit solve. However, this leads to non-symmetric force derivatives that require a generalized minimal residual method (GMRES) when using Newton's method. According to at least some embodiments of the present disclosure, the lagged plasticity approach may lead to symmetric force derivatives and thus a minimal residual method (MINRES) may be used to solve the linearized systems.

4.5 Return Mapping

In some embodiments, the return mapping may be a discrete version of the yield condition and flow rule. The return mapping may be a form of a projection, which enforces the yield condition on the stress, with the direction of the flow rule, defining the direction of the projection. The return mapping may be applied after the deformation gradient update so that the updated stress may satisfy the yield condition. To perform the return mapping, the QR-decomposition may be generated as $\hat{d}^E = \hat{F}^E D = QR$. $R^{n+1}$ is projected from $\hat{R}$ to satisfy the yield condition, before constructing $F^{E,n+1} = QR^{n+1}(D^{-1})$. In some embodiments, the stress satisfies $s(n, \theta)^T \sigma n + c_F n^T \sigma n \leq 0$, for every normal n to the curve, and every tangential direction $s(n, \theta)$ perpendicular to n. $\hat{\sigma}$ denotes the stress evaluated at $\hat{R}$ (the hypothetical stress if no plastic flow occurs), while $\sigma$ denotes the stress evaluated at $R^{n+1}$ (the stress accounting for plasticity); similar naming conventions apply to the $\hat{f}n$ and fn, and other hatted and non-hatted variables.

4.5.1 Surfaces

In some embodiments, for surfaces, the normal may be fixed $n = q_3$, and $s(n, \theta)$ may be eliminated by noting that maximum of $s(n, \theta)^T t$ is obtained at the angle corresponding to the projection of t into the plane with normal n: $\max_\theta s(n, \theta)^T t = |t + f_n n|$. The model determines if $\hat{r}_{33} > 1$, if the normal is in extension and no friction should occur, $r_{13} = r_{23} = 0$ is set. Further, $r_{33} = 1$ may be set, as it is used to penalize collisions and previous stretching in that direction may not be taken into account. If $\hat{r}_{33} \leq 1$, the model determines whether the condition $|\hat{t} - (\hat{t}^T n)n| + c_F n^T \hat{t} \leq 0$ is satisfied, where $n = q_3$. The traction may be expressed as $$t(R) = \frac{1}{r_{11} r_{22}} (\gamma r_{13} q_1 + \gamma r_{23} q_2 + k(r_{33} - 1)^2 q_3).$$

Thus the magnitude of the normal traction may be expressed as $$f_n(R) = \frac{k}{r_{11} r_{22}} (r_{33} - 1)^2,$$

and the magnitude of the tangential traction may be expressed as $$f_f(R) = \frac{\gamma}{r_{11} r_{22}} \sqrt{r_{13}^2 + r_{23}^2}.$$

If the condition $\hat{f}_f \le c_F \hat{f}_n$ is violated, uniform scaling may be applied:

$$r_{13} = c_f \frac{\hat{f}_n}{\hat{f}_f} \hat{r}_{13} \text{ and } r_{23} = c_f \frac{\hat{f}_n}{\hat{f}_f} \hat{r}_{23}$$

so that $f_f = c_F f_n$. The $r_{13}$ and $r_{23}$ components are changed, as these represent shearing along the surface of, e.g., clothing. In some embodiments, the magnitude of the tangential traction may change, but the direction may not change, corresponding to the uniform scaling. In some embodiments, the return mapping may be independent of the choice of in-plane energy $h(R_1)$. E.g., the in-plane surface energy may be used from instead.

Figure 16:
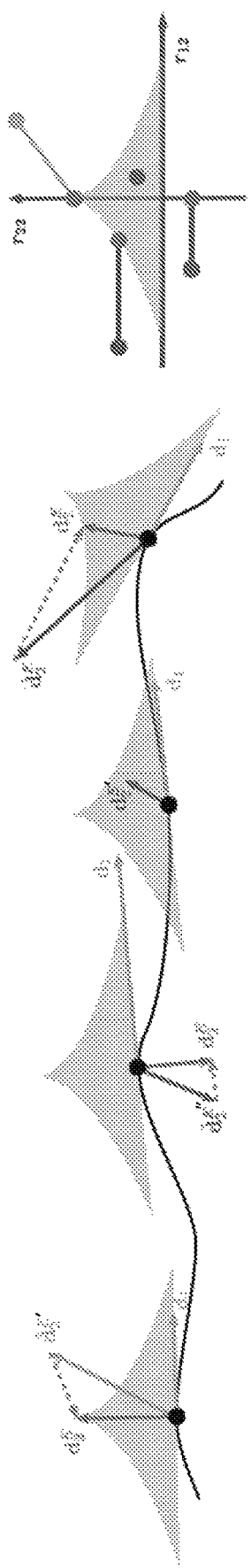
FIG. 16 illustrates a simulation of a return mapping for a 2D curve.

FIG. 16 illustrates the return mapping of a 2D curve. $d_1^E$ is unchanged. In the left figure, each shaded region corresponds to the feasible state of the deformed material normal $d_2^E$, and is determined by the yield function. The right figure shows the same yield surface in $r_{12}r_{22}$ space. The tip of the yield surface corresponds to the world space manifold normal and is usually different from $d_2$. For example, the Return mapping may take a trial strain $\widehat{d_2}$ and results in the $d_2^E$. The particle corresponding to $\widehat{d_2}$ is inside the yield surface and exhibits an elastic response. The particle corresponding to $\widehat{d_2}^E$ is under compression but experiences more shear than friction allows. Such a configuration is projected to the yield surface along the direction that avoids normal component change. The particle corresponding to $\widehat{d_2}^{E_I}$ is experiencing tension and is projected to the tip of the yield surface. The corresponding stress is zero, allowing materials to separate freely. The particle corresponding to $\widehat{d_2}^{E_{II}}$ is inverted from the original side of material (due to discrete numerical step). The shearing may be disabled by nullifying the $r_{22}$ component, and relying on elasticity to penalize such configuration.

4.5.2 Curves

Fibrous materials may have anisotropic friction. For example, hair may be smoother along the fiber direction than perpendicular to the fiber direction. Thus, an anisotropic friction rule may be used, which is stricter and easier to apply. Let $\sigma_{ij} = q_i^T \sigma q_j$ be the entries of $\sigma$ in the Q basis, and $J_2 = (\sigma_{22} - \sigma_{33})^2 + 4\sigma_{23}^2$. Then the conditions are $$\sqrt{J_2} + \frac{a}{2}(\sigma_{22} + \sigma_{33}) \le 0,$$

which is Mohr-Coulomb in the $q_2$, $q_3$ plane, and $$\sqrt{\sigma_{12}^2 + \sigma_{13}^2} + \frac{\beta}{2}(\sigma_{22} + \sigma_{33}) \le 0,$$

which controls the friction along the fiber. $\alpha$ and $\beta$ are material parameters. Larger $\alpha$ increases friction perpendicular to the fibers, and larger $\beta$ increases friction along the fiber.

The stricter conditions imply that $s(n, \theta)^T \sigma n + c_F n^T \sigma n \le 0$, with $c_F = \alpha + \beta$. The direction $s(n, \theta)$ may be written as $cq_1 + s\hat{q}$, where $c^2 + s^2 = 1$, and $q$ is in the $q_2$, $q_3$ plane. Thus, $f_f - c_F f_n \le |q_1^T \sigma n| + |\hat{q}^T \sigma n| + c_F n^T \sigma n$. Here $$|\hat{q}^t \sigma n| + c_F n^T \sigma n \le \sqrt{J_2} + \frac{c_F}{2}(\sigma_{22} + \sigma_{33}),$$

from the derivation of 2D Mohr-Coulomb. Therefore $$f_f - c_F f_n \le \sqrt{J_2} + \frac{a}{2}(\sigma_{22} + \sigma_{33}) + \sqrt{\sigma_{12}^2 + \sigma_{13}^2} + \frac{\beta}{2}(\sigma_{22} + \sigma_{33}),$$

which may be less or equal to 0 by assumption.

To enforce these constraints, the 2D volume preserving return mapping may be performed on $\hat{R}_3$. The mapping may be described in terms of $\hat{\epsilon}_1$ and $\hat{\epsilon}_2$, the logarithms of the singular values of $\hat{R}_3 = U \exp(\hat{\epsilon})V^T$, (with $\hat{\epsilon}_1 > \hat{\epsilon}_2$). The model determines if $\hat{\epsilon}_1 + \hat{\epsilon}_2 \ge 0$, in which case the hair has expanded laterally and no friction should occur and $\epsilon_1 = \epsilon_2 = 0$. Otherwise the model determines $$\sqrt{\hat{J}_2} + \frac{a}{2}(\hat{\sigma}_{22} + \hat{\sigma}_{33}) \le 0,$$

which corresponding to a situation where no plasticity occurs and $\epsilon_1 = \hat{\epsilon}_1$ and $\epsilon_2 = \hat{\epsilon}_2$. Otherwise plastic flow occurs and $\epsilon_1 = \hat{\epsilon}_1 - \eta$, $\epsilon_2 = \hat{\epsilon}_2 - \eta$ are set, which will preserve $\epsilon_1 + \epsilon_2 = \hat{\epsilon}_1 + \hat{\epsilon}_2$. In some embodiments, the model may choose $$\eta = \frac{\hat{\epsilon}_1 - \hat{\epsilon}_2}{2} + \frac{a\lambda}{4\mu}(\hat{\epsilon}_1 + \hat{\epsilon}_2)$$

to make $$\sqrt{J_2} + \frac{a}{2}(\sigma_{22} + \sigma_{33}) = 0.$$

Then the model constructs $R = U \exp(\epsilon)V^T$. The model determines if the condition $$\sqrt{\hat{\sigma}_{12}^2 + \hat{\sigma}_{13}^2} + \frac{\beta}{2}(\hat{\sigma}_{22} + \hat{\sigma}_{33}) \le 0$$

for shearing tangent to the fibers is satisfied. If the condition is violated, scaling is performed $r_{12} = \zeta \hat{r}_{12}$ and $r_{13} = \zeta \hat{r}_{12}$, to satisfy $$\sqrt{\sigma_{12}^2 + \sigma_{13}^2} + \frac{\beta}{2}(\sigma_{22} + \sigma_{33}) = 0 \left( \text{e.g., } \zeta = -\frac{\beta(\hat{\sigma}_{22} + \hat{\sigma}_{33})}{2\sqrt{\hat{\sigma}_{12}^2 + \hat{\sigma}_{13}^2}} \right).$$

5. Simulation Samples

Table 1 lists parameter choices for some simulation examples. Table 2 lists runtime performance results for some simulation examples. In some embodiments, some simulations may be run on Intel Xeon E5-2690 V2 with 19 threads.

TABLE 1

Parameter choices. Material Parameters: Here ρ refers to the density, E to the Young's modulus, η to the Poisson's ratio, γ to the shearing stiffness, k to the stiffness, $\Phi_F$ to the internal friction angle, and ν to the damping coefficient. For surfaces, the friction coefficient CF = tan $\Phi_F$. For curves, the friction coefficient along the fiber is β = tan $\Phi_F$.

Figure 13:
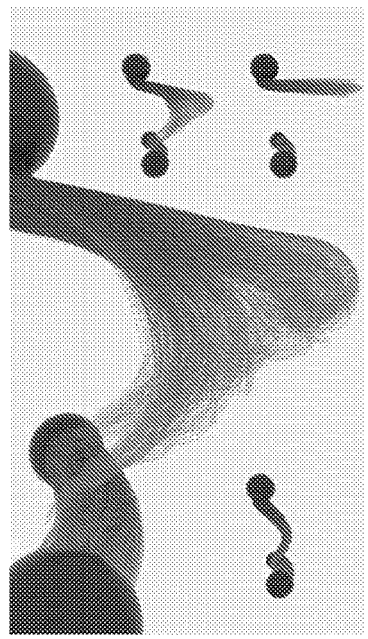
FIG. 13 illustrates a simulation of a hair tube with 2655 strands that is dropped onto another tube of hairs, showing detailed dynamics due to frictional contact between hairs. The simulation may run at, e.g., 11 seconds per frame.
Figure 17:
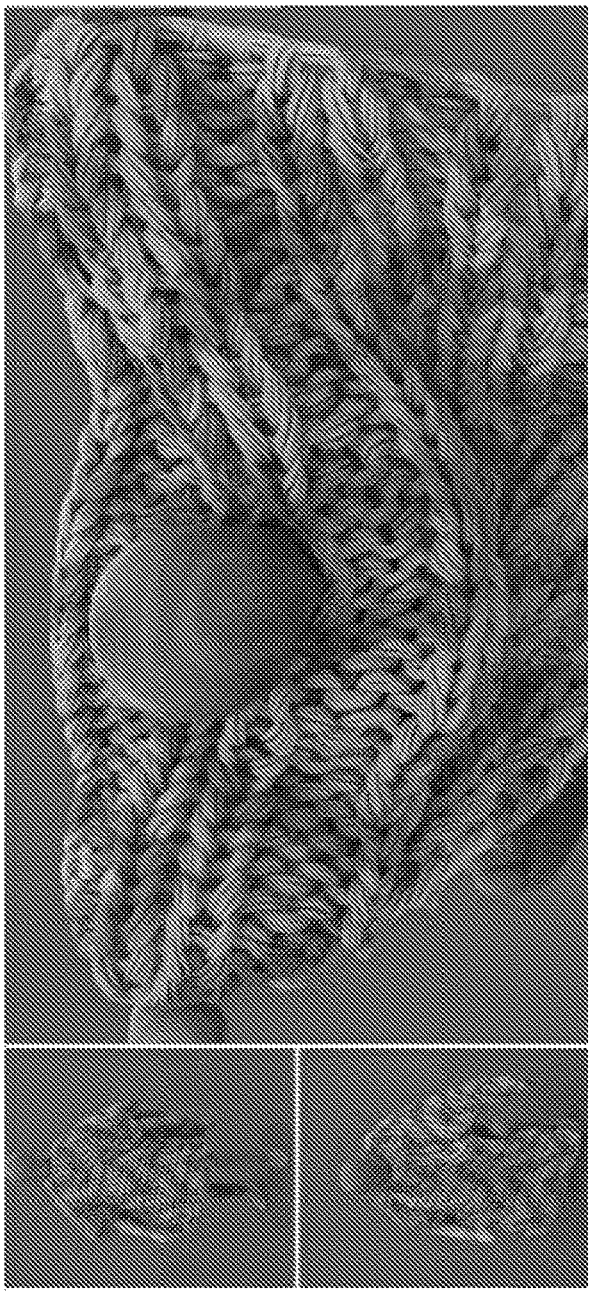
FIG. 17 illustrates a simulation of a character wearing a knitted poncho performing a jumping motion. The fiber elastoplasticity model captures detailed frictional contact behavior at the yarn level with multiple fiber threads per yarn. The simulation may run at, e.g., 1 minute per frame on average.

| | ρ | E | η | γ | k | ΦF | ν |
|---|---|---|---|---|---|---|---|
| Cloth Curtain (FIG. 14) | 2 | 400 | 0.3 | 0 | 800 | 0° | 0.8 |
| Cloth Curtain × 3 (FIG. 1) | 2 | 400 | 0.3 | 0 | 800 | 0° | 0.8 |
| Cloth & Ball (FIG. 3) | 2 | 200 | 0.3 | 0 | 100 | 0° | 0.7 |
| Cloth Twister (FIG. 4) | 2 | 200 | 0.3 | 0 | 400 | 0° | 0.1 |
| Knit Sweater (FIG. 7) | 4 | 500 | 0.3 | 100 | 500 | 10° | 1.0 |
| Knit Poncho (FIG. 17) | 4 | 500 | 0.3 | 500 | 2000 | 40° | 1.0 |
| Knit Twister (FIG. 5) | 4 | 500 | 0.3 | 500 | 2000 | 40° | 1.0 |
| Knit Curtain (FIG. 14) | 4 | 500 | 0.3 | 500 | 500 | 20° | 1.0 |
| Knit Anisotropy (FIG. 15) | 4 | 500 | 0.3 | 0 | 10000 | 0° | 1.0 |
| Shag Carpet (FIG. 2) | 2 | 400 | 0.3 | 0 | 800 | 0° | 0.8 |
| Tearing Fiber (FIG. 6) | 4 | 100 | 0.3 | 500 | 8000 | 40° | 0.5 |
| Hair Tubes (FIG. 13) | 1 | 60 | 0.3 | 10 | 2000 | 15° | 0.07 |
| Curtain & Goo (FIG. 19) | 2 | 400 | 0.3 | 0 | 40000 | 0° | 1.0 |
| Cloth & Slime (FIG. 18) | 2.5 | 15000 | 0.35 | 0 | 20000 | 0° | 0.85 |
| Curtain & Sand (FIG. 19) | 2 | 400 | 0.3 | 0 | 200000 | 0° | 0.0 |
| Cloth & Sand (FIG. 9) | 2 | 200 | 0.3 | 0 | 40000 | 0° | 0.0 |

The one perpendicular to the fiber is $$\alpha = \sqrt{\frac{2}{3}} \frac{2\sin(\Phi_F)}{3 - \sin(\Phi_F)}.$$

TABLE 2

Runtime performance results for some simulation examples. Element # denotes number of triangles (for surfaces), number of segments (for curves) or the total count (for coupling simulations). Memory usage is measured in the end of the first frame. Δt here means maximum allowed time step. The actual running Δt is adaptive and may be restricted by Courant-Friedrichs-Lewy (CFL) condition when the particle velocities are high. In the simulations, a CFL number equals to 0.3, e.g., particles are not allowed to move further than 0.3Δx in a time step.

| | s/Frame | Element # | Particle # | Δt | Δx | Mem(GB) |
|---|---|---|---|---|---|---|
| Cloth Curtain (FIG. 14) | 120 | 1.78M | 2.67M | $7 \times 10^{-5}$ | $2.2 \times 10^{-3}$ | 2.36 |
| Cloth Curtain × 3 (FIG. 1) | 123 | 1.39M | 2.09M | $7 \times 10^{-5}$ | $2.2 \times 10^{-3}$ | 2.16 |
| Cloth & Ball (FIG. 3) | 86 | 2.00M | 3.00M | $1 \times 10^{-4}$ | $1.5 \times 10^{-3}$ | 2.66 |
| Cloth Twister (FIG. 4) | 78 | 1.14M | 1.71M | $7 \times 10^{-5}$ | $3 \times 10^{-3}$ | 1.63 |
| Knit Sweater (FIG. 7) | 13 | 0.27M | 0.54M | $1 \times 10^{-4}$ | $1 \times 10^{-2}$ | 0.39 |
| Knit Poncho (FIG. 17) | 63 | 0.30M | 0.61M | $5 \times 10^{-5}$ | $1.6 \times 10^{-2}$ | 0.56 |
| Knit Twister (FIG. 5) | 10 | 0.31M | 0.62M | $2 \times 10^{-4}$ | $1.6 \times 10^{-2}$ | 0.45 |
| Knit Curtain (FIG. 14) | 17 | 0.31M | 0.62M | $1 \times 10^{-4}$ | $4 \times 10^{-3}$ | 0.99 |
| Knit Anisotropy (FIG. 15) | 38 | 0.31M | 0.62M | $5 \times 10^{-5}$ | $7 \times 10^{-4}$ | 0.46 |
| Shag Carpet (FIG. 2) | 26 | 0.48M | 0.97M | $1 \times 10^{-4}$ | $1 \times 10^{-2}$ | 0.65 |
| Tearing Fiber (FIG. 6) | 29 | 1.04M | 2.15M | $1 \times 10^{-4}$ | $3.2 \times 10^{-2}$ | 1.09 |
| Hair Tubes (FIG. 13) | 11 | 0.38M | 0.76M | $2 \times 10^{-4}$ | $7 \times 10^{-3}$ | 0.20 |
| Curtain & Goo (FIG. 19) | 62 | 0.07M | 2.59M | $2 \times 10^{-4}$ | $7.5 \times 10^{-3}$ | 0.83 |
| Cloth & Slime (FIG. 18) | 47 | 0.04M | 1.88M | $2 \times 10^{-4}$ | $1.2 \times 10^{-2}$ | 0.59 |
| Curtain & Sand (FIG. 19) | 85 | 0.06M | 2.90M | $2 \times 10^{-4}$ | $7.2 \times 10^{-3}$ | 1.36 |
| Cloth & Sand (FIG. 9) | 876 | 0.16M | 7.23M | $1 \times 10^{-4}$ | $5 \times 10^{-3}$ | 3.13 |

5.1 Effect of Friction

Figure 12:
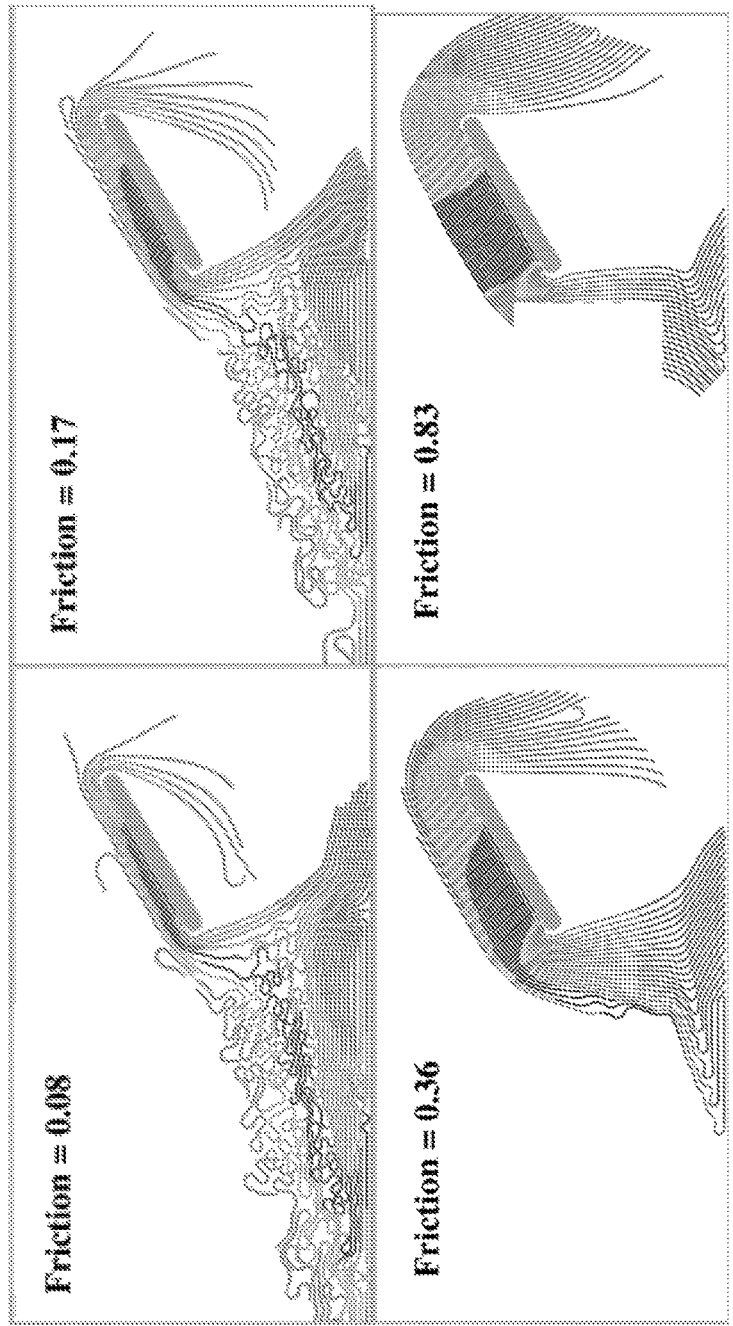
FIG. 12 illustrates effects of increasing friction in a 2-dimensional piling example. Friction increases from left to right.

FIG. 12 illustrates a simulation of 2D curves with different friction coefficients dropping on a block. Internal friction may be naturally controlled via adjusting $c_F$.

5.2 Simulation of Cloth

The surface elastoplasticity model may simulate cloth triangulated surfaces in various scenarios involving numerous self-collisions (see, e.g., FIG. 1, FIG. 3, FIG. 4 and FIG. 14). The elastoplasticity model can resolve frictional contacts with a modest computational cost. The run time may not grow with the number of colliding primitives. In some embodiments, for the cloth examples, zero friction ($c_F$=0 and γ=0) may be chosen to allow smooth sliding between cloth pieces.

5.3 Simulation of Knitted Garments, Hair and Fibers

Figure 14:
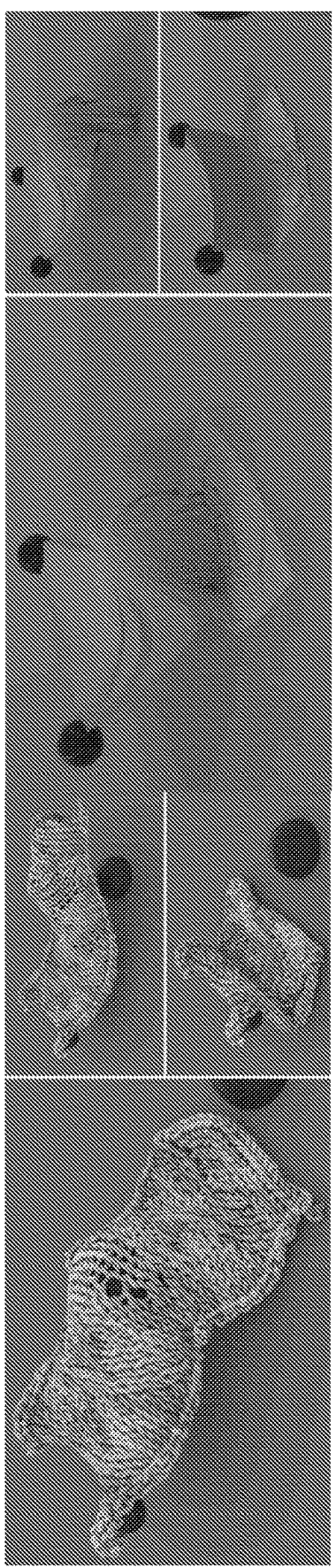
FIG. 14 illustrates a simulation of a knitted curtain being pushed by a sphere and folding back.
Figure 15:
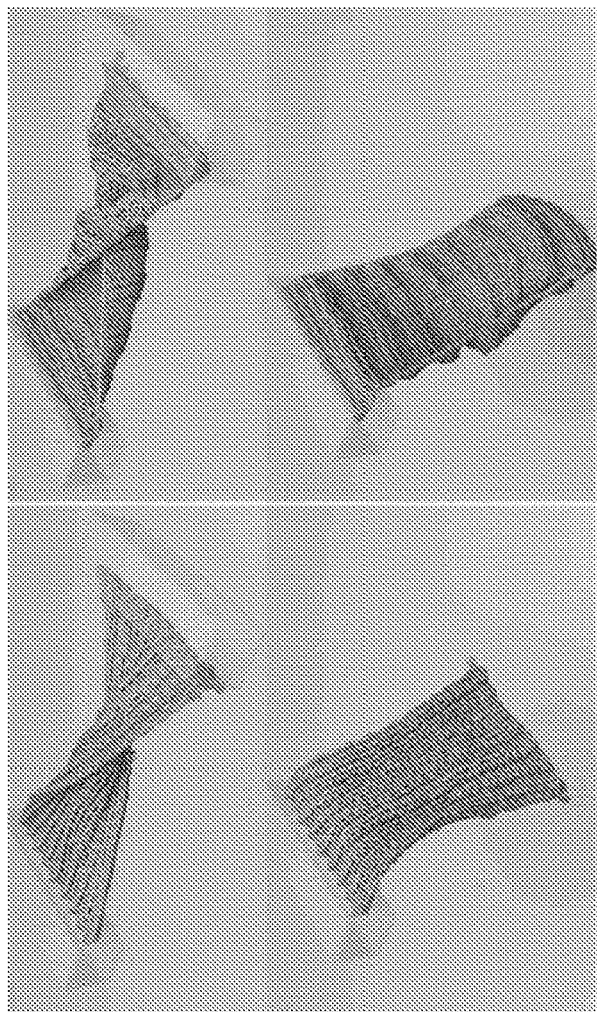
FIG. 15 illustrates a simulation of stretching, twisting and releasing a knitted cloth from different directions, which demonstrates handling yarn level anisotropic characteristics.

The fiber elastoplasticity may be simulated with yarn level simulation of knitted fabric. In some embodiments, multiple threads per yarn may be simulated. A mesh model may be used to simulate different examples including, e.g., dropping a sweater (FIG. 7), a jumping character wearing a poncho (FIG. 17), twisting a knitted cloth with a cylinder (FIG. 5), and hitting a knitted cloth curtain with a ball (FIG. 14). By accurately capturing frictional contact between yarns, the method inherently reproduces anisotropic stretching behaviors governed by knit patterns (FIG. 15). The fiber model may also be suitable for simulating hair (FIG. 13), shag carpet (FIG. 2) and other fibrous materials (FIG. 6). In some embodiments, each strand may be simulated. At least in some embodiments, the disclosed method scales well regardless of the complexity of segment contacts. RPIC damping may be used for stabilizing the simulations under large timesteps.

5.4 Two-Way Coupling

Figure 2:
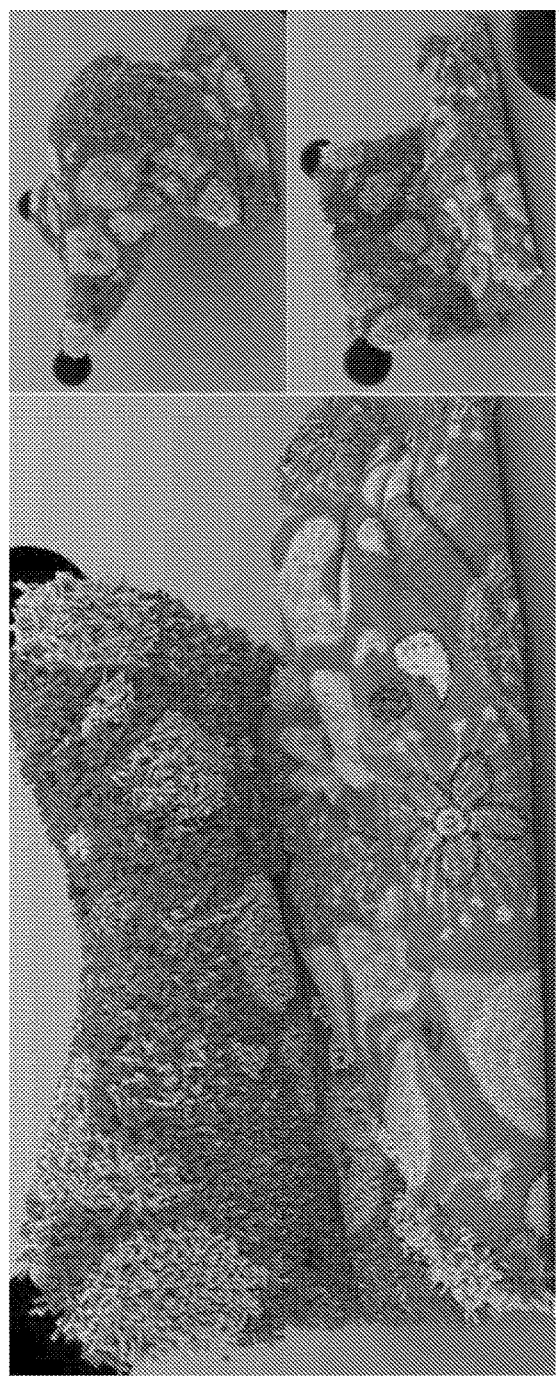
FIG. 2 illustrates a simulation of a shag carpet with 1M particles that is pushed by a sphere and folds back, showing detailed folds.
Figure 18:
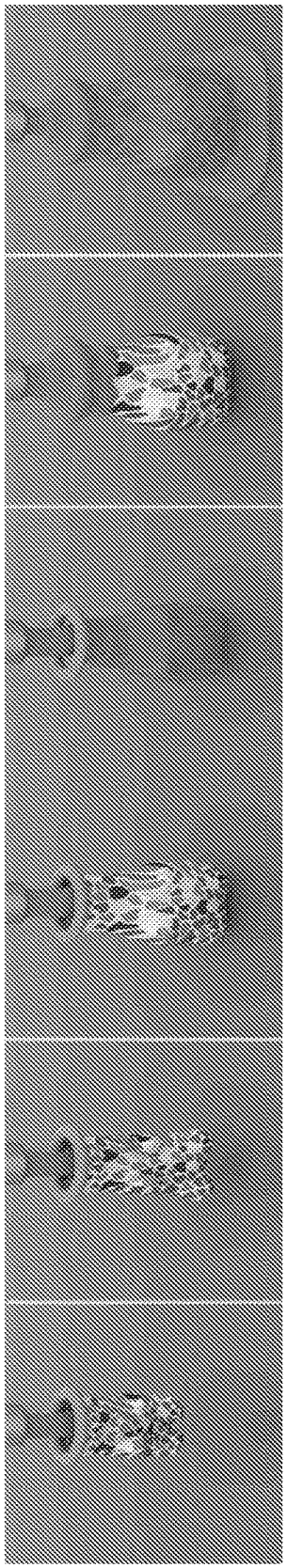
FIG. 18 illustrates a simulation of a two-way coupling of solids and fluids, as demonstrated with slime and a cloth bear.
Figure 19:
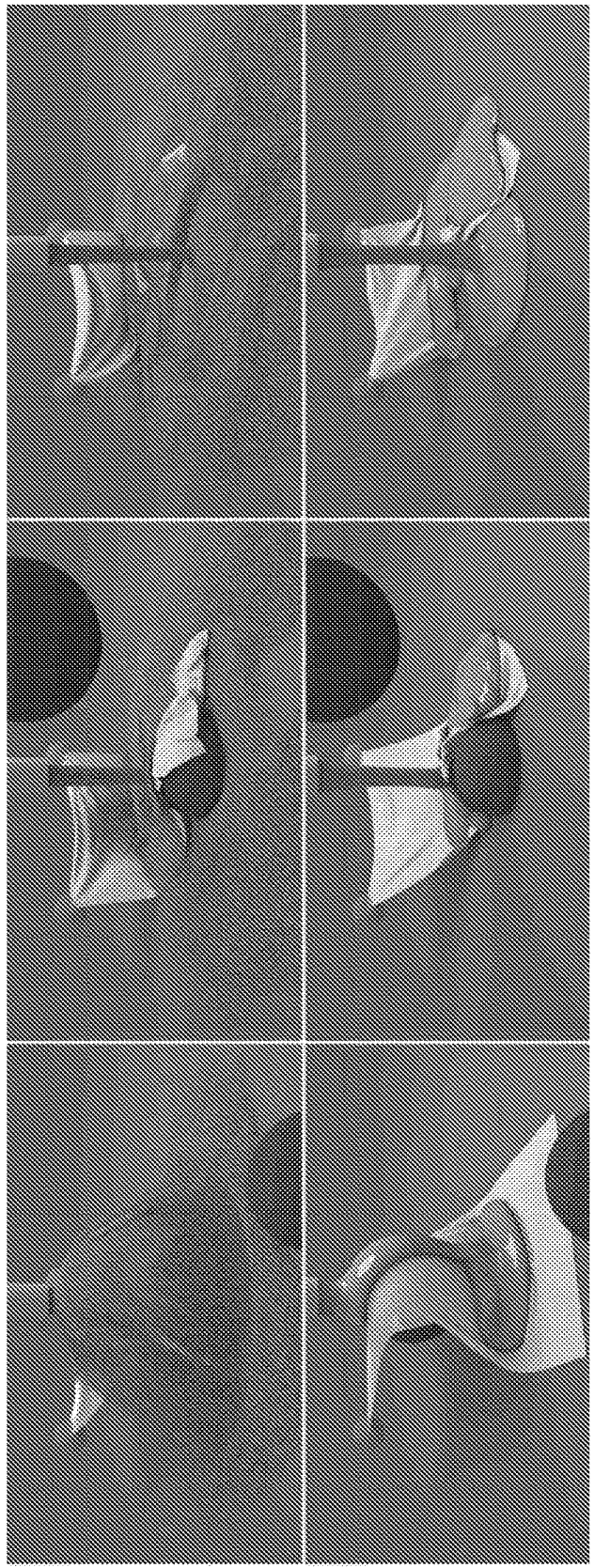
FIG. 19 illustrates a simulation of a cloth curtain being hit by a ball and coupling with sand and a simulation of a cloth curtain being hit by a ball and coupling with goo.

The disclosed method inherently handles multiple material coupling without requiring additional treatment. The constitutive model may be defined on each particle. For example, FIG. 1 and FIG. 9 illustrates a sand column with 7 millions particles coupled with a piece of cloth. FIG. 19 illustrates a cloth curtain getting hit by a ball while interacting with sand and/or goo. FIG. 18 illustrates dripping viscous green slime into an elastic bear geometry. A relatively high collision stiffness (k) may be set on the cloth to prevent sand from sticking to it.

5.5 Comparison with Other MPM Methods

The result of disclosed method is compared with other MPM approaches by simulating multiple curves dropping onto a block (see FIG. 10). Other meshless MPM causes numerical fracture of the material. The other method may just model the manifold stress response, resulting in unnatural clumping and numerical cohesion of curves. The disclosed method adopts a full elastoplasticity model, achieves natural and realistic dynamics, and exhibits a smooth frictional sliding appearance, without excessive frictional effects.

6. Additional Treatment

In some embodiments, the disclosed method may use a regular grid to resolve material interactions. The apparent thickness of the surface and/or curve may depend on the grid resolution and on the repulsion energy model. In some embodiments, the disclosed method may be modified to reduce or eliminate artifacts when if the grid resolution is large. For a large grid resolution, the artifacts may manifest as numerical separation where particles tend to stay separated by an amount about half a grid cell width or numerical stickiness. Thus, the motion of the grid may be accurate to resolve the proper behavior. Therefore the method may simulate frictionless materials and control the apparent thickness independent of the grid.

In some embodiments, the disclosed method is suitable for situation where the size of the surface or curve elements is at most the size of the grid spacing. In some embodiments, the disclosed method may be modified to reduce or eliminate persistent wrinkles, which may manifest when a mesh is fine compared to the grid. In some embodiments, the disclosed method may be modified to reduce or eliminate self-penetration, which may manifest when a mesh is coarse compared to the grid because the material coverage is not resolved well enough on the grid. When penetration accidentally happens (due to $\Delta t$ being too big), it may be resolved because elasticity may penalize that inverted collision direction. In some embodiments, the disclosed method may prevent the self-penetration by enforcing the CFL condition when choosing $\Delta t$. The disclosed method may use small time steps and increase overall run time.

In some embodiments, when transferring from particles to grid, the disclosed method may determine local neighbor information. In some embodiments, the penalty on compression in the normal direction may be treated as repulsion springs. In some embodiments, no fail-safe is used to prevent self-penetration when the repulsions fail. In some embodiments, the disclosed method may have smaller time steps for high grid resolution simulation, without fail-safes. In some embodiments, the disclosed method performs well for high resolution examples. E.g., for the cloth curtain example (FIG. 14), the disclosed method may achieve computation times of, e.g., 2 minutes per frame on average for, e.g., 1.8 million triangles.

In some embodiments, the disclosed method tends to scale as well as the particle-grid transfers. The process may be performed in parallel over multiple CPU threads. In some embodiments, performance gains may be achieved with a GPU implementation.

In some embodiments, derived from a continuum, during the discretization of surface elasticity, material local to the surface moves in straight lines with the normal. In some embodiments, the continuum based bending model may be used.

7. Details of Modeling Processes 7.1 QR Differentiation

In some embodiments, $\delta Q$ and $\delta R$ can be computed from $F$ and $\delta F$. This may be used for computing the linearized force in implicit time integration. If $F=QR$ where $Q$ is orthonormal with $Q^T Q=I$, and $$R = \begin{bmatrix} r_{11} & r_{12} & r_{13} \\ & r_{22} & r_{23} \\ & & r_{33} \end{bmatrix}$$

is upper triangular. The function is defined as $\psi(F)=\hat{\Psi}(R)$, then:

$$\delta F = Q\delta R + \delta Q R,$$

$$\delta \Psi(F) = \delta \hat{\Psi}(R),$$

$$\delta Q^T Q + Q^T \delta Q = 0,$$

where $\delta R$ is upper triangular:

$$Q^T \delta F = \delta R + Q^T \delta Q R,$$

$$\Omega = Q^T \delta Q = \begin{pmatrix} 0 & -\omega_3 & \omega_2 \\ \omega_3 & 0 & -\omega_1 \\ -\omega_2 & \omega_1 & 0 \end{pmatrix},$$

$$Q^T \delta F = \delta R + \begin{pmatrix} 0 & -\omega_3 & \omega_2 \\ \omega_3 & 0 & -\omega_1 \\ -\omega_2 & \omega_1 & 0 \end{pmatrix} R,$$

$$\begin{pmatrix} a & b & c \\ d & e & f \\ g & h & i \end{pmatrix} = \begin{pmatrix} * & * & * \\ 0 & * & * \\ 0 & 0 & * \end{pmatrix} + \begin{pmatrix} 0 & -\omega_3 & \omega_2 \\ \omega_3 & 0 & -\omega_1 \\ -\omega_2 & \omega_1 & 0 \end{pmatrix} \begin{pmatrix} r_{11} & r_{12} & r_{13} \\ 0 & r_{22} & r_{23} \\ 0 & 0 & r_{33} \end{pmatrix},$$

which implies:

$$d = \omega_3 r_{11}$$

$$g = -\omega_2 r_{11}$$

$$h = -\omega_2 r_{12} + \omega_1 r_{22}.$$

These equations can be used to solve for $\omega_1, \omega_2, \omega_3$. Then constructing $\delta Q = Q\Omega$ and then $\delta R = Q^T \delta F - Q^T \delta Q R$.

The corresponding 2D result is $$a = -\frac{(Q^T \delta F)_{21}}{r_{11}}$$

$$\delta Q = aQ \begin{pmatrix} 0 & 1 \\ -1 & 0 \end{pmatrix}$$

$$\delta R = Q^T \delta F - Q^T \delta Q R$$

7.2 Computing Stress $$\delta\Psi = \delta\hat{\Psi}$$

$$\frac{\partial\Psi}{\partial F}:\delta F = \frac{\partial\hat{\Psi}}{\partial R}:\delta R$$

$$\frac{\partial\Psi}{\partial F}:(Q\delta R + \delta Q R) = \frac{\partial\hat{\Psi}}{\partial R}:\delta R$$

$$\frac{\partial\Psi}{\partial F}:(Q\delta R) + \frac{\partial\Psi}{\partial F}:(\delta Q R) = \frac{\partial\hat{\Psi}}{\partial R}:\delta R$$

In some embodiments, the above holds for any $\delta Q$ and $\delta R$ that satisfy $\delta Q^T Q + Q^T \delta Q = 0$ and $\delta R$ may be upper triangular. Specifically, it may be shown that given arbitrary $\delta Q$, $\delta R$ with $\delta Q^T Q + Q^T \delta Q = 0$ and $SR$ upper triangular, $\exists \delta F$ such that $$\delta R = \frac{\partial R}{\partial F}(F):\delta F, \text{ and } \delta Q = \frac{\partial Q}{\partial F}:\delta F.$$

Using null $$\left[\frac{\partial Q}{\partial F}(F)\right] = \text{span}\{N_1, N_2, N_3, N_4, N_5, N_6\},$$

for all upper triangular $\delta R, \exists \delta F_Q \in$ null $$\left[\frac{\partial Q}{\partial F}(F)\right]^\perp$$

such that $$\delta Q = \frac{\partial Q}{\partial F}(F):\delta F_Q = \frac{\partial Q}{\partial F}(F):\delta(F_Q + F_R) \forall \, F_R \in \text{null}\left[\frac{\partial Q}{\partial F}(F)\right].$$

Further, it can be shown that $$Q\delta R + \delta Q R - \delta F_Q \in \text{null}\left[\frac{\partial Q}{\partial F}(F)\right]$$

and with $\delta F_R = Q\delta R + \delta Q R - \delta F_Q$, $\delta F = \delta F_Q = \delta F_R$ produces:

$$\delta R = \frac{\partial R}{\partial F}:\delta F, \text{ and } \delta Q = \frac{\partial Q}{\partial F}(F):\delta F.$$

If choosing $\delta Q = 0$ in Equation (1), then $$\frac{\partial\Psi}{\partial F}:(Q\delta R) = \frac{\partial\hat{\Psi}}{\partial R}:\delta R$$

$$\left(Q^T\frac{\partial\Psi}{\partial F}\right):\delta R = \frac{\partial\hat{\Psi}}{\partial R}:\delta R$$

Since $\delta R$ is any upper triangular matrix, $$\left(Q^T\frac{\partial\Psi}{\partial F}\right) \text{ and } \frac{\partial\hat{\Psi}}{\partial R}$$

have the same upper triangular part. Furthermore, since $R^T$ is lower triangular, $$Q^T\frac{\partial\Psi}{\partial F}R^T \text{ and } \frac{\partial\hat{\Psi}}{\partial R}R^T$$

have the same upper triangular part.

If the method chooses $\delta R = 0$ in Equation $$\frac{\partial\Psi}{\partial F}:(Q\delta R) + \frac{\partial\Psi}{\partial F}:(\delta Q R) = \frac{\partial\hat{\Psi}}{\partial R}:\delta R,$$

then $$\frac{\partial\Psi}{\partial F}:(\delta Q R) = 0$$

$$\left(\frac{\partial\Psi}{\partial F}R^T\right):\delta Q = 0$$

$$\left(\frac{\partial\Psi}{\partial F}R^T\right):(\delta Q Q^T Q) = 0$$

$$\left(\frac{\partial\Psi}{\partial\Psi}R^T Q^T\right):(\delta Q Q^T) = 0$$

$$\left(\frac{\partial\Psi}{\partial F}F^T\right):(\delta Q Q^T) = 0$$

Since $\delta Q Q^T$ is an arbitrary skew symmetric matrix (due to $\delta Q^T Q + Q^T \delta Q = 0$), for the above equation to hold, $$\frac{\partial\Psi}{\partial F}F^T$$

may be symmetric. Thus, Kirchoff stress $$\tau = \frac{\partial\Psi}{\partial F}F^T$$

is symmetric without needing to use conservation of angular momentum. Then $$\tau = \tau^T$$

$$\frac{\partial\Psi}{\partial F}F^T = F\left(\frac{\partial\Psi}{\partial F}\right)^T$$

$$\frac{\partial\Psi}{\partial F}R^T Q^T = QR\left(\frac{\partial\Psi}{\partial F}\right)^T$$

$$Q^T\frac{\partial\Psi}{\partial F}R^T = R\left(\frac{\partial\Psi}{\partial F}\right)^T Q$$

i.e., $$Q^T \frac{\partial \Psi}{\partial F} R^T$$

is symmetric.

In summary, $$Q^T \frac{\partial \Psi}{\partial F} R^T \text{ and } \frac{\partial \hat{\Psi}}{\partial R} R^T$$

have the same upper triangular part.

$$Q^T \frac{\partial \Psi}{\partial F} R^T$$

is symmetric. The tensor is denoted with $$A := Q^T \frac{\partial \Psi}{\partial F} R^T = Q^T \frac{\partial \Psi}{\partial F} F^T Q = Q^T \tau Q.$$

Therefore, A may be $\tau$ written in the Q basis.

7.3 A Curve in 3D

The upper triangular part of A may be constructed with $$\frac{\partial \hat{\Psi}}{\partial R} R^T,$$

then symmetry of A is used. Assuming $$\hat{\Psi} = f(r_{11}) + \frac{1}{2} g(r_{12}^2 = r_{13}^2) + h(r_{22}, r_{23}, r_{33}),$$

then $$\frac{\partial \hat{\Psi}}{\partial R} = \begin{bmatrix} f' & g' r^T \\ 0 & \hat{P} \end{bmatrix},$$

where $r = (r_{12}, r_{13})^T$, $R = \begin{bmatrix} r_{11} & r^T \\ 0 & \hat{R} \end{bmatrix}$, $\hat{P} = \frac{\partial h}{\partial \hat{R}}$.

Then $$A = \begin{bmatrix} f'' r_{11} + g' r^T r & g' r^T \hat{R}^T \\ g' r^T \hat{R}^T & \hat{P} \hat{R}^T \end{bmatrix}$$

Here, the process may choose $\hat{P} \hat{R}^T$ to be the dilational part of the Kirchoff stress from the 2×2 Stvk Hencky Drucker-Prager. In other words, assuming getting some f after the return mapping of dry sand from an input $F=\hat{R}$, the bottom right corner of A is replaced with pI, where $p=\text{tr}(\hat{\tau})/2$.

Under such a choice, $$A = \begin{bmatrix} f'' r_{11} + g' r^T r & g' r^T \hat{R}^T \\ g' r^T \hat{R}^T & pI \end{bmatrix}$$

In some embodiments, Mohr friction criteria may lead to the following maximization: maximization of $d^T \tau n + c_F n^T \tau n$ over all possible n that is perpendicular to the fiber direction, with all d perpendicular to n and has unit length. In other words, $d^T QAQ^T n + c_F n^T QAQ^T n$ is maximized over all possible n that is perpendicular to the fiber direction, with all d perpendicular to n and has unit length.

Therefore, $\tilde{d}^T A\tilde{n} + c_F \tilde{n}^T A\tilde{n}$ is maximized over all possible n that is perpendicular to the fiber direction, with all d perpendicular to n and has unit length, where $\tilde{n} = Q^T n$ and $\tilde{d} = Q^T d$. Since in the discretization, the fiber direction is $q_1$, therefore $q_1^T n = 0$, thus, $\tilde{n} = (0, c, s)$ for some $\theta$.

Therefore, $\tilde{d}^T A\tilde{n} + c_F \tilde{n}^T A\tilde{n}$ is maximized over possible n that is $(\theta, c, s)$ over all $\theta$, with all $\tilde{d}$ perpendicular to $\tilde{n}$ and has unit length.

Lagrangian multiplier may solve the maximization and lead to the maximum $\|\hat{R}r\|g' + c_F p$. If choosing $g(x)=x$, the yield surface may be $\|\hat{R}r\| + c_F p < 0$. The return mapping is then simply a scaling on r so that the yield criteria is satisfied.

7.4 A Surface in 3D

Surface may be similar to curve in the framework. With the codimensional discretization, the triangle may be mapped back to x-y plane. If the input 3D triangle at rest is $\hat{A}, \hat{B}, \hat{C}$, the method may define $\hat{D}_1 = \hat{B} - \hat{A}$ and $\hat{D}_2 = \hat{C} - \hat{A}$. This forms an imaginary $\hat{D}_s$, whose QR decomposition leads to the rotation from x-y plane of this triangle $\hat{Q}$, as well as the top part of $\hat{R}_{3\times 2}$ being the 2×2 version $D_m$. The third column of $\hat{Q}$ is the rotated $D_3$ where $D_3 = e_3$.

In some embodiments, for any triangle $d_1, d_2$ in world space, the full F may be constructed as:

$$F = [d_1, d_2, d_3] \begin{bmatrix} D_m^{-1} & \\ & 1 \end{bmatrix}.$$

In MPM, $d_3^{n+1} += (I + \Delta t \nabla v) d_3^n$, with $d_3^0 = \hat{q}_3$. $D_m$ is upper triangular, therefore $D_m^{-1}$ is upper triangular.

The method performs thin QR decomposition:

$$[d_1, d_2] = [q_1, q_2] \tilde{R}$$

where $\hat{R}$ may be 2×2 upper.

If $=q_1 \times q_2$ is constructed, then $$[d_1, d_2, d_3] = [q_1, q_2, q_3] \begin{bmatrix} \tilde{R} & (h_x, h_y)^T \\ 0^T & h_z \end{bmatrix}$$

where $Qh := d_3$. The QR decomposition of F is constructed as $$F = [q_1, q_2, q_3] \begin{bmatrix} \tilde{R} & (h_x, h_y)^T \\ 0^T & h_z \end{bmatrix} \begin{bmatrix} D_m^{-1} & \\ & 1 \end{bmatrix} := QR = Q \begin{bmatrix} r_{11} & r_{12} & r_{13} \\ & r_{22} & r_{23} \\ & & r_{33} \end{bmatrix}$$

Here $h = r_3 = Q^T d_3$.

The previous lemma in curve may still hold:

$$Q^T \frac{\partial \Psi}{\partial F} R^T \text{ and } \frac{\partial \Psi}{\partial R} R^T$$

have the same upper triangular part.

$$Q^T \frac{\partial \Psi}{\partial F} R^T$$

is symmetric. This tensor may be denoted with A $$A := Q^T \frac{\partial \Psi}{\partial F} R^T = Q^T \frac{\partial \Psi}{\partial F} F^T Q = Q^T \tau Q.$$

Therefore A may be r written in the Q basis. The upper triangular part of A may be constructed with $$\frac{\partial \hat{\Psi}}{\partial R} R^T,$$

then symmetry of A is used.

7.4.1 Surface Elastoplasticity $D_3 = e_3$, then $$F = Q \begin{bmatrix} r_{11} & r_{12} & r_{13} \\ & r_{22} & r_{23} \\ & & r_{33} \end{bmatrix}$$

Physically, the top left is in plane (x-y) deformation of the triangle, since $$\begin{bmatrix} r_{11} & r_{12} & r_{13} \\ & r_{22} & r_{23} \\ & & r_{33} \end{bmatrix} e_3 = r_3,$$

r3 represents the deformation of $D_3$. because $h = r_3 = Q^T d_3$, $|r_3|$ is the length change, $r_{13}^2 + r_{23}^2$ is the shearing (or the deviation from being perpendicular to the x-y triangle plane). Shearing may also penalize length change.

Defining $$\hat{\Psi} = f(r_{33}) + \frac{1}{2} g(r_{13}^2 + r_{23}^2) + h(r_{11}, r_{12}, r_{21}, r_{22}),$$

then $$\frac{\partial \hat{\Psi}}{\partial R} = \begin{bmatrix} \hat{P} & g'r \\ 0^T & f' \end{bmatrix},$$

where $r = (r_{13}, r_{23})^T$, $R = \begin{bmatrix} \hat{R} & r \\ 0^T & r_{33} \end{bmatrix}$, $\hat{P} = \frac{\partial h}{\partial \hat{R}}$.

Then, $$A = \begin{bmatrix} \hat{P}\hat{R}^T + g'rr^T & g'r_{33}r \\ g'r_{33}r^T & f'r_{33} \end{bmatrix}$$

In some embodiments, Mohr friction criteria leads to the following maximization: Maximization of $d^T \tau n + c_F n^T \tau n$ over all possible n that is perpendicular to the manifold plane, with all d perpendicular to n and has unit length. In other words, $d^T Q A Q^T n + c_F n^T Q A Q^T n$ is maximized over all possible n that is perpendicular to the manifold plane, with all d perpendicular to n and has unit length. In other words, $\hat{d}^T A \tilde{n} + c_F \tilde{n}^T A \tilde{n}$ is maximized over all possible n that is perpendicular to the manifold plane, with all d perpendicular to n and has unit length, where $\tilde{n} = Q^T n$ and $\hat{d} = Q^T d$.

n perpendicular to manifold plane means $n = k(d_1 \times d_2)$ for some k (unit length constraint is extra).

$$[d_1, d_2] = [q_1, q_2] \hat{R},$$

where $\tilde{R}$ is upper triangular 2×2, this means $k(d_1 \times d_2) = z(q_1 \times q_2)$ for some z. Therefore, $n = \pm q_3$. Therefore $\tilde{n} = Q^T n = \pm e_3$.

The process maximizes $\hat{d}^T A \tilde{n} + c_F \tilde{n}^T A \tilde{n}$ over $\tilde{n} = \pm e_3$, with all $\tilde{d} = (c, s, 0)$ for some θ. The maximum is $\pm g' r_{33} |r| + c_F f' r_{33}$. Assuming $f(x) = \frac{1}{3} k(1-x)^3$ for $x \leq 1$, 0 otherwise, $g(x) = \gamma x$. When $r_{33} > 1$, $f = 0$, the maximum is $\gamma r_{33} |r|$.

In this case, the return mapping causes r to be zero.

When $r_{33} < 1$, the maximum is $$\pm \gamma r_{33} |r| - c_F k (r_{33} - 1)^2 r_{33}.$$

The yield surface is therefore $$\max\left(\pm \frac{\gamma}{k} r_{33} |r| - c_F (r_{33} - 1)^2 r_{33}\right) \leq 0$$

If $r_{33}$ is negative (corresponding to inverted collision), the max may choose $$-\frac{\gamma}{k}.$$

The return mapping is setting r to be 0. Otherwise, r may be scaled to satisfy $$\frac{\gamma}{k} |r| - c_F (r_{33} - 1)^2 \leq 0.$$

7.5 A Curve in 2D 2D derivation may follow 3D curve derivation:

$$Q^T \frac{\partial \Psi}{\partial F} R^T \text{ and } \frac{\partial \hat{\Psi}}{\partial R} R^T$$

have the same upper triangular part.

$$Q^T \frac{\partial \Psi}{\partial F} R^T$$

is symmetric. This tensor may be denoted with $$A := Q^T \frac{\partial \Psi}{\partial F} R^T = Q^T \frac{\partial \Psi}{\partial F} F^T Q = Q^T \tau Q.$$

Therefore, A may be T written in the Q basis.

The energy choice may be $$\hat{\Psi} = f(r_{11}) + \frac{1}{2} g(r_{12}^2) h(r_{22}),$$

then

-continued $$\frac{\partial \hat{\Psi}}{\partial R} = \begin{bmatrix} f' & g'r_{12} \\ 0 & h' \end{bmatrix},$$

where $R = \begin{bmatrix} r_{11} & r_{12} \\ 0 & r_{22} \end{bmatrix}, \hat{P} = \frac{\partial h}{\partial \hat{R}}.$ $$A = \begin{bmatrix} f'r_{11} + g'r_{12}^2 & g'r_{12}r_{22} \\ g'r_{12}r_{22} & h'r_{22} \end{bmatrix}.$$

In some embodiments, Mohr friction criteria may lead to the following maximization: maximization of $d^T \tau n + c_F n^T \tau n$ over all possible n that is perpendicular to the fiber direction, with all d perpendicular to n and has unit length. In other words, $d^T QAQ^T n + c_F n^T QAQ^T n$ is maximized over all possible n that is perpendicular to the fiber direction, with all d perpendicular to n and has unit length. Therefore, $\tilde{d}^T A\tilde{n} + c_F \tilde{n}^T A\tilde{n}$ is maximized over all possible n that is perpendicular to the fiber direction, with all d perpendicular to n and has unit length, where $\tilde{n}=Q^T n$ and $\tilde{d}=Q^T d$. Since in discretization, the fiber direction is $q_1$, therefore $q_1^T n=0$, then $\tilde{n}=(0, 1)$ Thus, $\tilde{d}^T A\tilde{n} + c_F \tilde{n}^T A\tilde{n}$ is maximized over $\tilde{n}=(0, \pm 1)$ and $\tilde{d}=(\pm 1, 0)$. In other words, $\tilde{d}^T A\tilde{n} + c_F \tilde{n}^T A\tilde{n}$ is maximized over $\tilde{n}=(0, \pm 1)$ and $\tilde{d}=(\pm 1, 0)$. The maximum is $\pm g'r_{12}r_{22} + c_F h'r_{22}$. Assume $g(x)=\gamma x$, $h(x)=\frac{1}{3}s(1-x)^3$ for $x \le 1$, 0 otherwise.

When $r_{22}>1$, $h=0$, the maximum may be $|\gamma r_{12}r_{22}|$, the return mapping may set $r_{12}=0$. When $r_{22}<1$, the maximum is $\pm \gamma |r_{12}|r_{22} - c_F s(1-r_{22})^2 r_{22}$. The yield surface is therefore max $$\left( \pm \frac{\gamma}{s} |r_{12}|r_{22} - c_F(1-r_{22})^2 r_{22} \right) \le 0.$$

If $r_{22}<0$, the maximum may be $$-\frac{\gamma}{s}.$$

The return mapping may set $r_{12}=0$. Otherwise, $r_{22} \in [0, 1]$, scale $r_{12}$ may be scaled to satisfy $$\frac{\gamma}{s} |r_{12}| - c_F(1-r_{22})^2 \le 0.$$

7.6 Derivative of $\hat{F}^E$ $$\frac{\partial \hat{F}_p^E}{\partial x_i}$$

is a third order tensor, and does not depend on $\hat{x}$ because $\hat{F}_p^E$ is linear in $\hat{x}_i$. Here the process performs the derivation. by definition $$\hat{d}_{p,\beta}^E(\hat{x}) = \hat{x}_{mesh(p,\beta)} - \hat{x}_{mesh(p,0)}$$

$$\hat{d}_{p,\beta}^E(\hat{x}) = (\nabla \hat{x})_p d_{p,\beta}^{E,n}$$

$$\hat{x}_q = \sum_i \hat{x}_i w_{iq}^n$$

$$\hat{F}_p^E(\hat{x}) = \hat{d}_p^E D_p^{-1}$$

Plugging in:

$$\hat{F}_{p,\alpha\epsilon}^E = \sum_i \left( \sum_{\beta=1}^{\gamma} (w_{i,mesh(p,\beta)}^n - w_{i,mesh(p,0)}^n) x_{i,\alpha} D_{\beta\epsilon}^{-1} + \sum_{\beta=\gamma+1}^{3} \sum_{\kappa=1}^{3} \frac{\partial w_{ip}^n}{\partial x_\kappa} d_{p,\kappa\beta}^{E,n} x_{i,\alpha} D_{p,\beta\epsilon}^{-1} \right)$$

Differentiating:

$$\frac{\partial \hat{F}_{p,\alpha\epsilon}^E}{\partial x_{i\varsigma}} =$$

$$\sum_{\beta=1}^{\gamma} (w_{i,mesh(p,\beta)}^n - w_{i,mesh(p,0)}^n) \delta_{\alpha\varsigma} D_{p,\beta\epsilon}^{-1} + \sum_{\beta=\gamma+1}^{3} \sum_{\kappa=1}^{3} \frac{\partial w_{ip}^n}{\partial x_\kappa} d_{p,\kappa\beta}^{E,n} \delta_{\alpha\varsigma} D_{p,\beta\epsilon}^{-1}$$

which may not depend on $\hat{x}$. The undeformed segment or triangle may be treated as being aligned with the x-axis or xy-plane respectively. Thus, the initial F may no longer be I, but rather the rotation which maps the axis aligned element to its initial position in space. This is may not be an issue as the elastic energy density $\psi$ may be world space rotation invariant. However, this allows assuming that $D_p$ is block diagonal of the form $$D_p = \begin{bmatrix} D_{11} & 0 & 0 \\ 0 & 1 & 0 \\ 0 & 0 & 1 \end{bmatrix}$$

for segments and $$D_p = \begin{bmatrix} D_{11} & D_{12} & 0 \\ 0 & D_{22} & 0 \\ 0 & 0 & 1 \end{bmatrix}$$

for triangles. This may save memory for $D_p$, and simplify computing $D_p^{-1}$.

7.7 Computation of Force on Grid $$f_i^{(iii)}(\hat{x}) = -\sum_{p \in I^{(iii)}} V_p^0 \frac{\partial \psi}{\partial F} : \frac{\partial \hat{F}_p^E}{\partial x_i}$$

$$f_{i\zeta}^{(iii)}(\hat{x}) = -\sum_{p \in I^{(iii)}} \sum_\alpha \sum_\epsilon V_p^0 \frac{\partial \psi}{\partial F} \frac{\partial \hat{F}_{p,\alpha\epsilon}^E}{\partial x_{i\varsigma}}$$

$$f_{i\zeta}^{(iii)}(\hat{x}) = -\sum_{p \in I^{(iii)}} \sum_\epsilon V_p^0 \frac{\partial \psi}{\partial F_{\zeta\epsilon}} \left( \sum_{\beta=1}^{\gamma} (w_{i,mesh(p,\beta)}^n - w_{i,mesh(p,0)}^n) D_{p,\beta\epsilon}^{-1} + \sum_{\beta=\gamma+1}^{3} \sum_{k=1}^{3} \frac{\partial w_{ip}^n}{\partial x_k} d_{p,k\beta}^{E,n} D_{p,\beta\epsilon}^{-1} \right)$$

$$f_{i\zeta}^{(iii)}(\hat{x}) = -\sum_{p \in I^{(iii)}} \sum_{\epsilon} V_p^0 \frac{\partial \psi}{\partial F_{\zeta\epsilon}} \left( \sum_{\beta=1}^{\gamma} (w_{i,mesh(p,\beta)}^n - w_{i,mesh(p,0)}^n) D_{p,\beta\epsilon}^{-1} + \sum_{\beta=\gamma+1}^{3} \sum_{k=1}^{3} \frac{\partial w_{ip}^n}{\partial x_k} d_{p,k\beta}^{E,n} \delta_{\beta\epsilon} \right)$$

Define $$f_{q\zeta}^{(ii)}(\hat{x}) = -\sum_{p \in I^{(iii)}} \sum_{\epsilon} V_p^0 \frac{\partial \psi}{\partial F_{\zeta\epsilon}} \sum_{\beta=1}^{\gamma} (\delta_{q,mesh(p,\beta)} - \delta_{q,mesh(p,0)}) D_{p,\beta\epsilon}^{-1}$$

$$= -\sum_{p \in I^{(iii)}} \sum_{\epsilon=1}^{\gamma} V_p^0 \frac{\partial \psi}{\partial F_{\zeta\epsilon}} \sum_{\beta=1}^{\gamma} (\delta_{q,mesh(p,\beta)} - \delta_{q,mesh(p,0)}) D_{p,\beta\epsilon}^{-1}$$

Then $$f_{i\zeta}^{(iii)}(\hat{x}) = \sum_{p \in I^{(ii)}} f_{q\zeta}^{(ii)}(\hat{x}) w_{ip}^n - \sum_{p \in I^{(ii)}} \sum_{\epsilon} V_p^0 \frac{\partial \psi}{\partial F_{\zeta\epsilon}} \sum_{\beta=\gamma-1}^{3} \sum_{k=1}^{3} \frac{\partial w_{ip}^2}{\partial x_k} d_{p,k\beta}^{E,n} \delta_{\beta\epsilon}$$

$$f_{i\zeta}^{(iii)}(\hat{x}) = \sum_{p \in I^{(ii)}} f_{q\zeta}^{(ii)}(\hat{x}) w_{ip}^n - \sum_{p \in I^{(ii)}} \sum_{\epsilon=\gamma+1}^{3} V_p^0 \frac{\partial \psi}{\partial F_{\zeta\epsilon}} \sum_{k=1}^{3} \frac{\partial w_{ip}^2}{\partial x_k} d_{p,k\epsilon}^{E,n}$$

7.8 A Sample Simulation Process

| Simulate |
|---|
| 1: procedure TIME_STEP |
| 2:    TRANSFER_TO_GRID |
| 3:    GRID_STEP |
| 4:    TRANSFER_TO_PARTICLES |
| 5:    UPDATE_PARTICLE_STATE |
| 6:    PLASTICITY |
| 1: procedure TRANSFER_TO_GRID |
| 2:    for all grid nodes i do |
| 3:       $m_i^n \leftarrow \Sigma_p w_{ip}^n m_p$ |
| 4:       $v_i^n \leftarrow \frac{1}{m_i^n} \Sigma_p w_{ip}^n m_p (v_p^n + C_p^n(x_i - x_p^n))$ |
| 1: procedure GRID_STEP |
| 2:    $\langle v_i^* \rangle \leftarrow \langle v_i^n \rangle + \text{FORCE\_INCREMENT} (\langle F_p^{E,n} \rangle)$ |
| 3:    $\langle \tilde{v}_i^{n+1} \rangle \leftarrow \text{GRID\_COLLISIONS} (\langle v_i^* \rangle)$ |
| 4:    $\langle \bar{v}_i^{n+1} \rangle \leftarrow \text{FRICTION} (\langle \tilde{v}_i^{n+1} \rangle, \langle \tilde{v}_i^{n+1} - v_i^* \rangle)$ |
| 1: procedure TRANSFER_TO_PARTICLES |
| 2:    for all particles p of type (i) and (ii) do |
| 3:       $v_p^{n+1} \leftarrow \sum_i w_{ip}^n \bar{v}_i^{n+1}$ |
| 4:    for all particles p of type (iii) do |
| 5:       $v_p^{n+1} \leftarrow \sum_{\beta=0}^{\gamma} \frac{1}{\gamma} v_{mesh(p,\beta)}^{n+1}$ |
| 6:    for all particles p do |
| 7:       $C_p^{n+1} \leftarrow \sum_i w_{ip}^n \bar{v}_i^{n+1} (x_i - x_p^n)^T$ |
| 1: procedure UPDATE_PARTICLE_STATE |
| 2:    for all particles p of type (i) do |

| Simulate |
|---|
| 3:       $x_p^{n+1} \leftarrow \sum_i w_{ip}^n (x_i^n + \Delta t \bar{v}_i^{n+1})$ |
| 4:       $\nabla v_p \leftarrow \sum_i \bar{v}_i^{n+1} (\nabla w_{ip}^n)^T$ |
| 5:       $\hat{F}_p^{E,n+1} \leftarrow (I + \Delta t \nabla v_p) F_p^{E,n}$ |
| 6:    for all particles p of type (ii) do |
| 7:       $x_p^{n+1} \leftarrow \sum_i w_{ip}^n (x_i^n + \Delta t \bar{v}_i^{n+1})$ |
| 8:    for all particles p of type (iii) do |
| 9:       $x_p^{n+1} | \leftarrow \sum_{\beta=0}^{\gamma} \frac{1}{\gamma} x_{mesh(p,\beta)}^{n+1}$ |
| 10:      $\nabla v_p \leftarrow \sum_i \bar{v}_i^{n+1} (\nabla w_{ip}^n)^T$ |
| 11:      for $\beta = 1$ to $\gamma$ do |
| 12:         $\hat{d}_{p,\beta}^{E,n+1} \leftarrow x_{mesh(p,\beta)}^{n+1} - x_{mesh(p,0)}^{n+1}$ |
| 13:      for $\beta = \gamma + 1$ to 3 do |
| 14:         $\hat{d}_{p,\beta}^{E,n+1} \leftarrow (I + \Delta t \nabla v_p) d_p^{E,n}$ |
| 15:         $\hat{F}_p^{E,n+1} \leftarrow \hat{d}_p^{E,n+1} D_p^{-1}$ |
| 1: procedure PLASTICITY |
| 2:    for all particles p of type (i) and (iii) do |
| 3:       $F_p^{E,n+1} \leftarrow \text{RETURN\_MAPPING} (\hat{F}_p^{E,n+1})$ |

Figure 20:
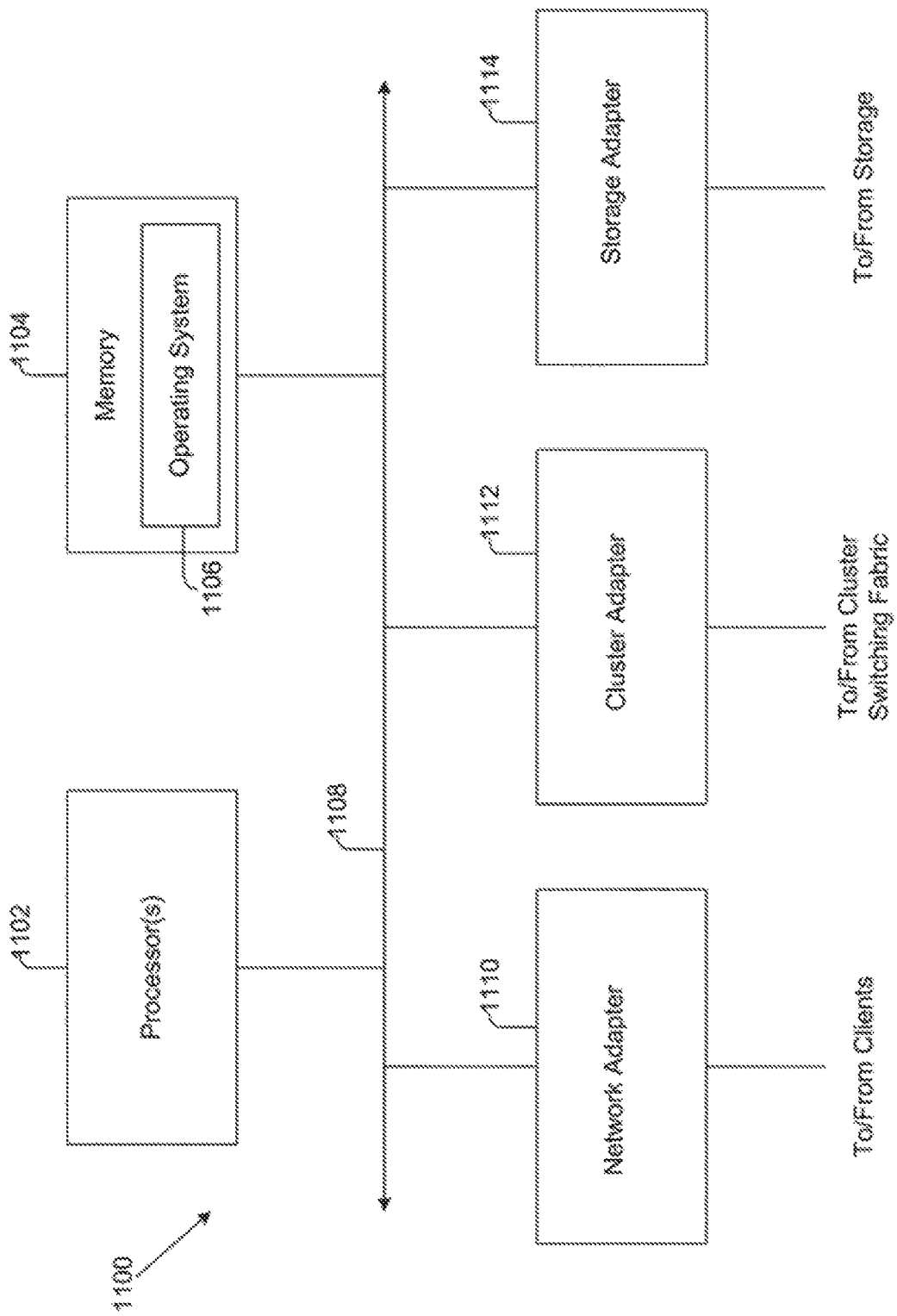
FIG. 20 is a high-level block diagram illustrating an example of a hardware architecture of a computing device that may perform various processes as disclosed.

FIG. 20 is a high-level block diagram illustrating an example of a hardware architecture of a computing device 1100 that may perform various processes as disclosed, according various embodiments of the present disclosure. The computing device 1100 may execute some or all of the processor executable process operations or procedures described herein. In various embodiments, the computing device 1100 includes a processor subsystem that includes one or more processors 1102. Processor 1102 may be or may include, one or more programmable general-purpose or special-purpose microprocessors, digital signal processors (DSPs), programmable controllers, application specific integrated circuits (ASICs), programmable logic devices (PLDs), or the like, or a combination of such hardware based devices.

The computing device 1100 can further include a memory 1104, a network adapter 1110, a cluster access adapter 1112 and a storage adapter 1114, all interconnected by an interconnect 1108. Interconnect 1108 may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other data communication system.

The cluster access adapter 1112 includes one or more ports adapted to couple the computing device 1100 to other devices. In the illustrated embodiment, Ethernet can be used as the clustering protocol and interconnect media, although other types of protocols and interconnects may be utilized within the cluster architecture described herein.

The computing device 1100 can be embodied as a single- or multi-processor storage system executing a storage operating system 1106 that can implement a high-level module, e.g., a storage manager, to logically organize the information as a hierarchical structure of named directories and files at the storage devices. The computing device 1100 can further include graphical processing unit(s) for graphical processing tasks or processing non-graphical tasks in parallel.

The memory 1104 can comprise storage locations that are addressable by the processor(s) 1102 and adapters 1110, 1112, and 1114 for storing processor executable code and data structures. The processor 1102 and adapters 1110, 1112, and 1114 may, in turn, comprise processing elements and/or logic circuitry configured to execute the software code and manipulate the data structures. The operating system 1106, portions of which is typically resident in memory and executed by the processors(s) 1102, functionally organizes the computing device 1100 by (among other things) configuring the processor(s) 1102 to invoke. It will be apparent to those skilled in the art that other processing and memory implementations, including various computer readable storage media, may be used for storing and executing program instructions pertaining to the disclosed technology.

The network adapter 1110 can include multiple ports to couple the computing device 1100 to one or more clients over point-to-point links, wide area networks, virtual private networks implemented over a public network (e.g., the Internet) or a shared local area network. The network adapter 1110 thus can include the mechanical, electrical and signaling circuitry included to connect the computing device 1100 to the network. Illustratively, the network can be embodied as an Ethernet network or a Fibre Channel (FC) network. A client can communicate with the computing device over the network by exchanging discrete frames or packets of data according to pre-defined protocols, e.g., TCP/IP.

The storage adapter 1114 can cooperate with the storage operating system 1106 to access information requested by a client. The information may be stored on any type of attached array of writable storage media, e.g., magnetic disk or tape, optical disk (e.g., CD-ROM or DVD), flash memory, solid-state disk (SSD), electronic random access memory (RAM), micro-electro mechanical and/or any other similar media adapted to store information, including data and parity information. The storage adapter 1114 can include multiple ports having input/output (I/O) interface circuitry that couples to the disks over an I/O interconnect arrangement, e.g., a conventional high-performance, Fibre Channel (FC) link topology. In various embodiments, the cluster adapter 1112 and the storage adapter 1114 can be implemented as one adaptor configured to connect to a switching fabric, e.g., a storage network switch, in order to communicate with other devices and the mass storage devices.

Amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified.

While the present disclosure has been described and illustrated with reference to specific embodiments thereof, these descriptions and illustrations do not limit the present disclosure. It should be understood by those skilled in the art that various changes may be made and equivalents may be substituted without departing from the true spirit and scope of the present disclosure as defined by the appended claims. The illustrations may not be necessarily drawn to scale. There may be distinctions between the artistic renditions in the present disclosure and the actual apparatus due to manufacturing processes and tolerances. There may be other embodiments of the present disclosure which are not specifically illustrated. The specification and drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations of the present disclosure.

What is claimed is:

1. A method of visualizing a codimensional object having a frictional contact, comprising:
    transferring masses and momentums of a plurality of particles of the codimensional object to a grid including a plurality of grid nodes;
    updating momentums of the grid nodes based on the transferred masses and momentums of the particles;
    transferring the updated momentums of the grid nodes to the particles of the codimensional object;
    updating positions of the particles and deformation gradients of the particles based on the updated momentums of the grid nodes;
    projecting the deformation gradients for plasticity of the codimensional object;
    updating elastic components and plastic components of the codimensional object;
    detecting a collision response of the codimensional object and tracking deformation of the codimensional object;
    updating orthogonal components of the deformation gradients that correspond to an elastic response of the frictional contact of the codimensional object; and
    outputting a visualization of the object based on the positions of the particles of the codimensional object.

2. The method of claim 1, wherein the collision response of the codimensional object is based on an elastoplastic constitutive model.

3. The method of claim 2, wherein the codimensional object is a codimensional elastic object, and deformation of the codimensional elastic object is tracked in a Lagrangian view.

4. The method of claim 2, wherein the elastoplastic constitutive model includes an anisotropic hyperelastic constitutive model that separately characterizes the collision response to at least one manifold strain, at least one shearing, and at least one compression.

5. The method of claim 4, wherein the at least one shearing and the at least one compression are in directions orthogonal to a manifold of the codimensional object for the at least one manifold strain.

6. The method of claim 4, wherein the anisotropic hyperelastic constitutive model includes a plastic flow that enforces a Coulomb friction inequality between shear and normal stresses in directions orthogonal to a surface or a curve of the codimensional object.

7. The method of claim 2, wherein the collision response is caused by a self-collision between portions of the codimensional object or a collision between the codimensional object and another codimensional object.

8. The method of claim 1, wherein the deformation gradients represent spatial derivatives of material deformation mapping of the codimensional object.

9. The method of claim 1, further comprising:
damping stretching motions or shearing motions of the codimensional object.

10. The method of claim 1, wherein the grid is represented as a Lagrangian mesh.

11. The method of claim 1, wherein the plastic components of the codimensional object are updated using a return mapping process.

12. The method of claim 1, further comprising:
determining a next time step;
repeating at the next time step the transferring masses and momentums of the particles of the codimensional object, the updating momentums of the grid nodes, the transferring the updated momentums of the grid nodes, the updating positions of the particles and the deformation gradients of the particles, the projecting the deformation gradients, and the updating elastic components and the plastic components of the codimensional object.

13. A non-transitory computer readable storage medium storing a program to render an animated elastoplastic object, the program comprising instructions executable by a processor to:
represent the animated elastoplastic object using a mesh representation including a plurality of particles, each particle of the particles including a mass and a momentum;
transfer the masses and momentums of the particles to a grid representation of the animated elastoplastic object, the grid representation including a plurality of grid nodes;
update momentums of the grid nodes of the grid representation based on an elastic force;
transfer the momentums of the grid nodes to the particles of the mesh representation;
tracking deformation of the animated elastoplastic object caused by a collision;
updating orthogonal components of deformation gradients that correspond to an elastic response of a frictional contact of the animated elastoplastic object;
determine updated positions of the particles of the mesh representation based on the transferred momentums; and
update a visualization of the animated elastoplastic object based on the updated positions of the particles.

14. The computer readable storage medium of claim 13, wherein the elastic force depends on an elastic deformation gradient.

15. The computer readable storage medium of claim 14, the instructions further comprising instructions to:
update the elastic deformation gradient based on motions of the grid nodes of the grid representation over a time step.

16. The computer readable storage medium of claim 15, the instructions further comprising instructions to:
project the elastic deformation gradient for modeling an elastic or plastic motion of the animated elastoplastic object.

17. The computer readable storage medium of claim 14, wherein the elastic deformation gradient is specified by a differentiation of an elastic potential energy.

18. The computer readable storage medium of claim 13, the instructions further comprising instructions to:
further update the momentums of the grid nodes of the grid representation based on a gravitational force.

19. The computer readable storage medium of claim 13, wherein each mass of a grid node of the grid nodes of the grid representation is contributed by masses of multiple particles of the particles of the mesh representation.

20. The computer readable storage medium of claim 13, wherein the momentums of the grid nodes of the grid representation are updated using a symplectic Euler approach or a backward Euler approach.

* * * * *